US007287048B2

(12) United States Patent
Bourbonnais et al.

(10) Patent No.: US 7,287,048 B2
(45) Date of Patent: Oct. 23, 2007

(54) TRANSPARENT ARCHIVING

(75) Inventors: Serge Bourbonnais, Palo Alto, CA (US); Charles Daniel Wolfson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 10/753,905

(22) Filed: Jan. 7, 2004

(65) Prior Publication Data
US 2005/0149584 A1 Jul. 7, 2005

(51) Int. Cl.
G06F 17/30 (2006.01)
G06F 7/00 (2006.01)

(52) U.S. Cl. .......................... 707/204; 707/10
(58) Field of Classification Search ................ 707/204, 707/10
See application file for complete search history.

(56) References Cited

U.S. PATENT DOCUMENTS

| | | | | |
|---|---|---|---|---|
| 5,475,834 | A | | 12/1995 | Anglin et al. ................ 395/600 |
| 5,926,836 | A | | 7/1999 | Blumenau .................... 711/162 |
| 5,987,452 | A | * | 11/1999 | Kung .............................. 707/4 |
| 6,324,581 | B1 | * | 11/2001 | Xu et al. ...................... 709/229 |
| 6,453,354 | B1 | * | 9/2002 | Jiang et al. .................. 709/229 |
| 2001/0049677 | A1 | | 12/2001 | Talib et al. ....................... 707/3 |
| 2001/0056429 | A1 | | 12/2001 | Moore et al. ................ 707/101 |
| 2002/0120639 | A1 | | 8/2002 | Basin et al. .................. 707/204 |
| 2003/0023585 | A1 | | 1/2003 | Castelli ............................. 707/3 |
| 2003/0046313 | A1 | * | 3/2003 | Leung et al. ................ 707/204 |
| 2004/0128027 | A1 | * | 7/2004 | Groll et al. .................. 700/245 |
| 2004/0133609 | A1 | * | 7/2004 | Moore et al. ............... 707/200 |
| 2005/0138081 | A1 | * | 6/2005 | Alshab et al. .............. 707/200 |

OTHER PUBLICATIONS

Interim Guidelines for Examination of Patent Applications for Patent Subject Matter Eligibility; Annex IV; pp. 50-57; Nov. 22, 2005.*
International Search Report, International application No. PCT/EP2004/053465, Applicant's file reference SVL030082, Date of mailing of the international search report Apr. 15, 2005.
ANONYMOUS: "LiveArchive" OUTERBAY, [online] Dec. 4, 2003 [Retrieved on Apr. 5, 2005] Retrieved from the Internet: <URL:http://web.archive.org/web/20031204202934/http://www.outerbay.com/solutions_livearchive.html> 1 page.

(Continued)

Primary Examiner—John Cottingham
Assistant Examiner—Kimberly Lovel
(74) Attorney, Agent, or Firm—Janet M. Skafar; Karna J. Nisewaner; Christine H. Smith

(57) ABSTRACT

A method, apparatus, and article of manufacture implementing the method, transparently archives data. One or more data sources store data. A first data mover moves a first subset of data from the one or more data sources to a first federated archive in accordance with a first set of rules.

In another aspect of the invention, a query is processed to retrieve a second subset of data, and a portion of the second subset of data is retrieved from the first federated archive. In yet another aspect of the invention, the processing of the query determines whether any data that would satisfy the query is stored in the first federated archive.

33 Claims, 12 Drawing Sheets

OTHER PUBLICATIONS

L.M. Haas et al., "Transforming Heterogeneous Data with Database Middleware: Beyond Integration," Bulletin of the IEEE Computer Society Technical Committee on Data Engineering, vol. 22(1), pp. 31-36, 1999, Downloaded from: http://www.almaden.ibm.com/cs/garlic.

M.J. Carey et al., "Towards Heterogeneous Multimedia Information Systems: The Garlic Approach," IBM Almaden Research Center, San Jose, CA 95120, downloaded from: http://www.almaden.ibm.com/cs/garlic, Published in: Proceedings of the International Workshop on Research Issues in Data Engineering (RIDE): Distributed Object Management, Mar. 1995, pp. 124-131.

The Garlic Project, IBM Research, IBM Corporation, 1995, http://www.almaden.ibm.com/cs/garlic.

M.L. Songini, "IBM Plans Software to Link Data From Multiple Sources," Computerworld, Jan. 13, 2003, http://www.computerworld.com/databasetopics/data/story/0.10801.77466.00.html.

S.H. Rutledge and J. Medicke, "Database Integration with DB2® Relational Connect, Building Federated Systems with Relational Connect and Database Views," 2001, Downloaded from: http://www7b.boulder.ibm.com/dmdd/library/techarticle/rutledge/0112rutledge.pdf.

L. Haas and E. Lin, "IBM Federated Database Technology," Mar. 2002, Downloaded from: http://www7b.boulder.ibm.com/dmdd/library/techarticle/0203haas/0203haas.html.

Written Opinion of the International Searching Authority, International application No. PCT/EP2004/053465, Applicant's file reference SVL030082, Date of mailing Apr. 15, 2005 <6 pages>.

* cited by examiner

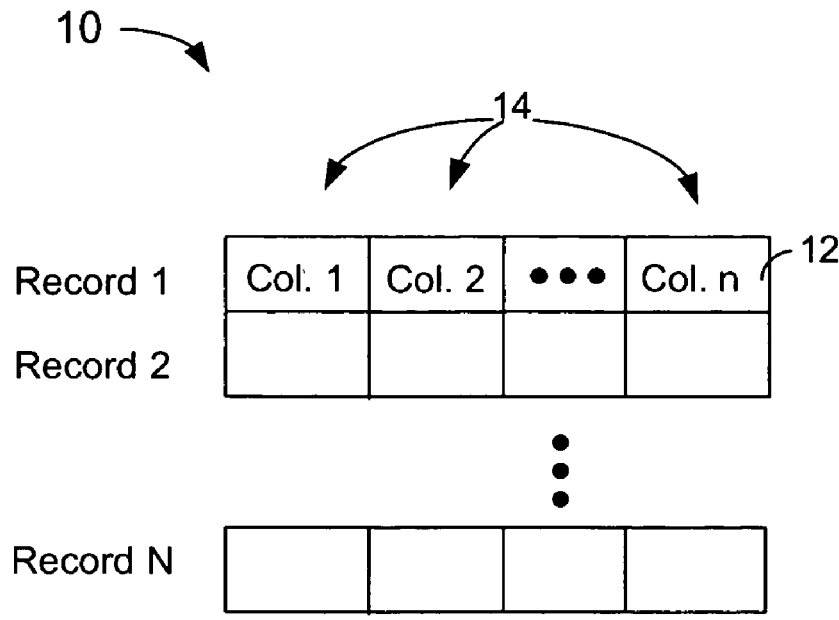

| Rule Name 221 | Table Name 222 | Predicate 223 | Correlation Column 224 | Timestamp Column 225 | Retention Period 226 | Schedule 227 | Target Server 228 | Description 229 |
|---|---|---|---|---|---|---|---|---|
| R1 | SALES | [closedate] not null | - | closedate | 90 days | asap | ARCHIVE1 | Sale closed |
| R2 | SALES | CUSTOMERS.status != 'preferred' and CUSTOMERS.ckey = [custid] | [custid] | closedate | 365 days | asap | ARCHIVE1 | Preferred customers |
| R3 | SALES | [price] > 1000000 | - | closedate | 5 years | asap | ARCHIVE1 | Over $1 Million SALES |
| R4 | CUSTOMERS | [custkey] not in SALES.custid | [custkey] | SALES.closedate | 1 year | 1st of the month, midnight | ARCHIVE2 | Inactive Customers |
| R5 | INVOICES | count( [invoiceid] ) < 5000000 | - | billdate | oldest | 1st of the month, midnight | NULL | Keep less than 5 million rows in the INVOICES table |
| R6 | PRODUCTS | [availability] != 'discontinued' | - | - | immediate | asap | ARCHIVE3 | Archive any Discontinued product |

TRANSPARENT ARCHIVING

BACKGROUND OF THE INVENTION

1. Field of the Invention

The invention relates to a technique, specifically a method, an apparatus, and an article of manufacture implementing the method, to perform archiving transparently.

2. Description of the Related Art

Database management systems allow a user to access data quickly and conveniently. In database management systems, data is stored in tables. Physically, the tables are typically stored on hard disk drives so that the data may be accessed quickly.

FIG. 1 depicts an exemplary database table 10 of a database management system. The table 10 has rows 12 and columns 14 to store data. A row 12 is also referred to as a record.

Archive storage is also used to store data. Typically, the storage devices of an archive storage system are slower and less expensive than hard disk drives. As a database grows, that is, as records are added to the tables of the database, the amount of data may become too large to be conveniently managed in a single database, degrading user response time and system performance. In addition, much of this data may never need to be accessed again; however, the data needs to be preserved. Therefore, typically a portion of the data is deleted from the database and moved to archive storage.

In the financial sector, applications such as trading desks collect a large amount of data in databases. Various governmental regulations mandate that the data be retained for very long periods of time. In these applications, recent data is referenced often; older data is referenced occasionally, and perhaps never again. As the amount of data grows, the older data is archived to keep the database small and manageable, provide a better response time, and allow utilities such as backup to run faster. That archive storage typically costs less to maintain than some other types of storage, also provides an incentive for archiving.

Typically, the process of archiving, and retrieving data from archive storage, especially relational data from a relational database management system, is performed manually by a system administrator. When retrieving archived data, finding the desired archived data is often a challenge that requires manual intervention and a separate search of the archive media. Therefore, the user cannot access the combination of the archived and non-archived data in a single request, and the user is not provided with a combined presentation of the archived and non-archived (or live) data.

Therefore, there is a need for a method, apparatus and article of manufacture to allow a user to transparently both archive and access archived data. In addition, the method should also allow a user to combine both archived and non-archived (or live) data using a single query against the live data.

SUMMARY OF THE INVENTION

To overcome the limitations in the prior art described above, and to overcome other limitations that will become apparent upon reading and understanding the present specification, the present invention discloses a method, apparatus, and article of manufacture for transparent archiving.

In accordance with the present invention, one or more data sources store data. A first data mover moves a first subset of data from the one or more first data sources to a first federated archive in accordance with a first set of rules.

In another aspect of the invention, the first data mover moves data to multiple federated archives in accordance with the first set of rules.

In yet another aspect of the invention, a second federated archive is coupled to the first federated archive, the first data mover moves a first subset of data to the second federated archive. A second data mover moves at least a portion of the first subset of data to the second federated archive in accordance with a second set of rules.

In another aspect of the invention, a query is processed to retrieve a second subset of data. A first portion of the second subset of data is retrieved from the first federated archive. In yet another aspect of the invention, the query is processed using a view. Alternately, the query is processed by invoking a table function. In another alternate aspect of the invention, the query is processed in accordance with at least one configuration parameter. In yet another alternate aspect of the invention, the query is processed based on the meta-data to determine whether a portion of the second subset of data is stored in the first federated archive.

In this way, archiving can be performed transparently in a federated environment, and archived data can be transparently retrieved from federated archive storage.

BRIEF DESCRIPTION OF THE DRAWINGS

The teachings of the present invention can be readily understood by considering the following detailed description in conjunction with the accompanying drawings, in which:

FIG. 1 depicts an exemplary table in accordance with the prior art;

FIG. 2 depicts a high-level flowchart of an embodiment of a technique to move data from a database to an archive, and access that data as if it still resided in the database from which it was removed;

FIG. 13 depicts a table containing exemplary archiving rules;

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to transparently archive data. One or more data sources store data. A first data mover moves a first subset of data from the one or more data sources to a first federated archive in accordance with a first set of rules.

FIG. 2 depicts a high-level flowchart of an embodiment of the technique of the present invention. In step 22, a subset of data is moved from a data source to a federated archive transparently in accordance with a set of rules. In step 24, a portion of the subset of the data in the federated archive is accessed as if that data was stored in the data source.

In a more particular embodiment, data is moved from a local database management system to the federated archive in accordance with the set of rules. The move operation is transparent because a user is not aware that data is being archived. A query is performed against the data in the local database management system, which is enabled for federating archives. The data that satisfies the query from the federated archive and the local database management system are aggregated to provide an aggregated result. The query returns the aggregated result so that the user is not aware that archived data was retrieved.

Figure 3:
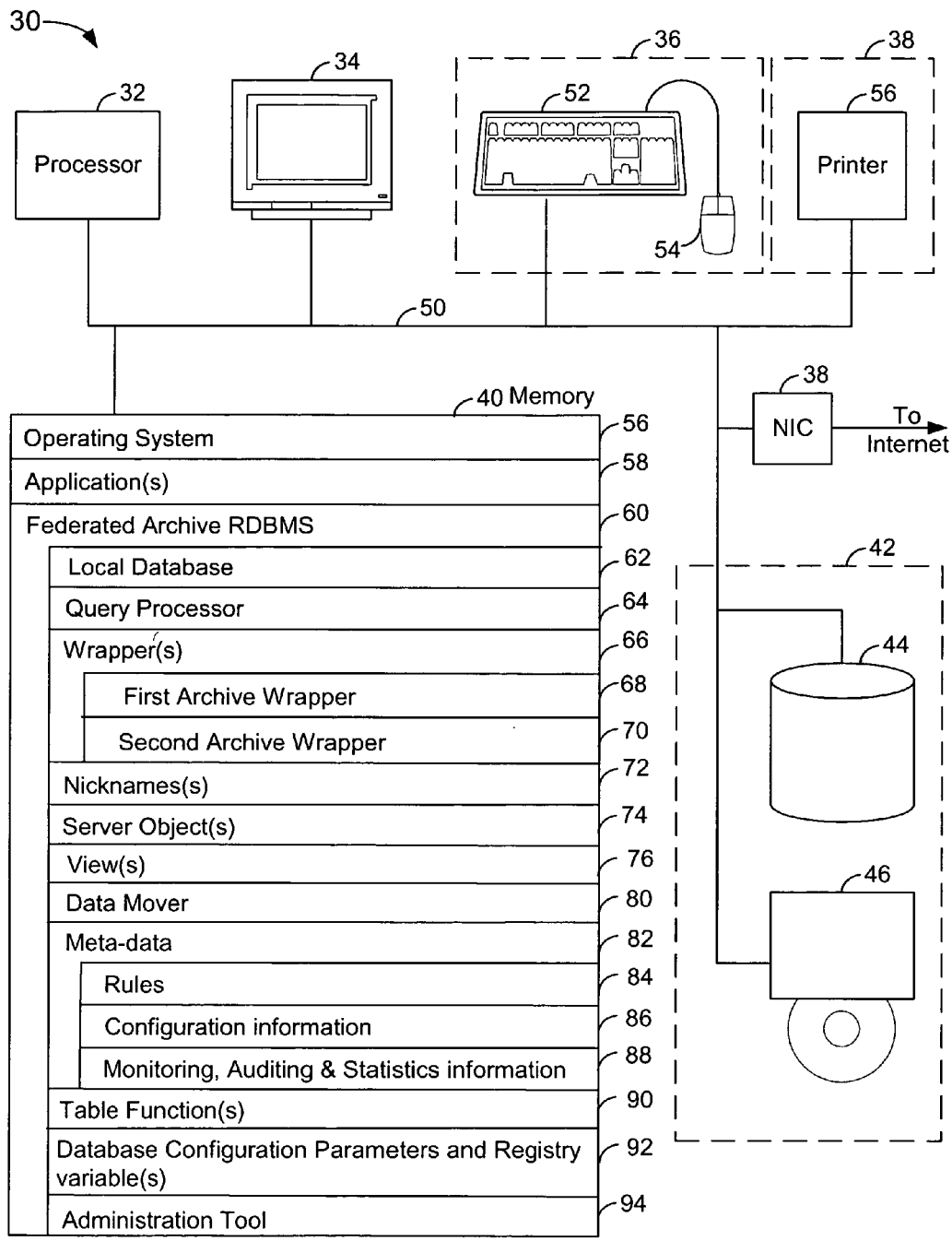
FIG. 3 depicts an illustrative computer system that uses the teachings of the present invention.

FIG. 3 depicts an illustrative computer system 30 that utilizes the teachings of the present invention. The computer system 30 comprises a processor 32, display 34, input interfaces (I/F) 36, communications interface 38, memory 40, disk memories 42 such as hard disk drive 44 and optical disk drive 46, and output interface(s) 48, all conventionally coupled by one or more busses 50. The input interfaces 36 comprise a keyboard 52 and mouse 54. The output interface is a printer 56. The communications interface 38 is a network interface card (NIC) that allows the computer 30 to communicate via a network, for example, the Internet. The communications interface 30 may be coupled to a transmission medium such as, for example, twisted pair, coaxial cable, or fiberoptic cable. In another exemplary embodiment, the communications interface provides a wireless interface.

The memory 40 generally comprises different modalities, illustratively semiconductor memory, such as random access memory (RAM), and disk drives. The memory 40 stores an operating system 56, one or more application programs 58, and a federated archive relational database management system (RDBMS) 60. The operating system 56 may be implemented by any conventional operating system, such as z/OS® (Registered Trademark of International Business Machines Corporation), AIX® (Registered Trademark of International Business Machines Corporation), UNIX® (UNIX is a Registered Trademark of in the United States and other countries licensed through X/Open Limited), WINDOWS® (Registered Trademark of Microsoft Corporation), and LINUX® (Registered Trademark of Linus Torvalds).

The federated archive RDBMS 60 allows a user to execute commands to assign data to, delete data from, or query the data stored in repositories. In one embodiment, the commands are Structured Query Language (SQL) statements that conform to a Structured Query Language standard as published by the American National Standards Institute (ANSI) or the International Standards Organization (ISO). In alternate embodiments, languages other than SQL may be used. Typically, a repository is queried using an SQL SELECT statement, and data is assigned to a repository using an SQL INSERT or UPDATE statement.

In a more particular embodiment, the federated archive RDBMS 60 is implemented, at least in part, using some EBM® DB2® Information Integrator (IBM and DB2 are registered trademarks of International Business Machines Corporation) functions. However, the inventive technique is not meant to be limited to being implemented using IBM® DB2® Information Integrator, and may be implemented with other relational database management systems with federation capability. Alternately, for example, the federated archive RDBMS is an XML store.

In the memory 40, the operating system 56, applications 58 and federated archive RDBMS 60 are comprised of instructions and data. The specific software instructions that implement the present invention are incorporated in the federated archive RDBMS 60. Generally, the federated archive RDBMS 60 software is tangibly embodied in a computer-readable medium, for example, memory 40 or, more specifically, one of the disk drives 42, and is comprised of instructions which, when executed, by the processor 32, causes the computer system 30 to utilize the present invention.

In one embodiment, the memory 40 may store a portion of the software instructions and data in semiconductor memory, while other portions of the software instructions and data are stored in disk memory. The memory 40 stores various ones of the following depending on the embodiment:

The operating system 56;

The applications 58;

The federated archive RDBMS 60, in which, depending on the embodiment, comprises various combinations of the following:

A local database management system (Local Database) 62 that provides an active database that stores local tables and is directly accessed by the federated archive RDBMS;

A query processor 64 that receives an SQL statement, parses the SQL statement and determines an appropriate execution plan to access the data;

Wrappers 66 to provide an interface to a respective archive storage system, comprising a first wrapper 68 to provide an interface to a first archive storage system, and, in another embodiment, a second wrapper 70 to provide a second interface to a second archive storage system, in other embodiments additional wrappers provide an interface to a respective external database management system, file system, or application;

One or more nicknames 72 that are used like local tables in the local database 62 and map to archive objects, and are used to reference the archive objects; in an embodiment in which the archive storage is another relational database system, a nickname maps to a remote table;

A server object 74 to identify the archive server that has the archive storage system;

View(s) 76 to aggregate data from at least one federated archive and the local database 62;

A data mover 80 to move data from the local database 62 to a federated archive storage system;

Meta-data 82 that stores information used by the federated archive RDBMS comprising a set of archiving rules 84, configuration information 86, and monitoring, auditing & statistics information 88;

Table function(s) 90 that, in some embodiments, are used to retrieve data from the archive storage system;

Database Configuration parameters and Registry variable(s) 92 that specify the behavior, at least in part, of the federated archive RDBMS; and An administration tool 94 that the system administrator uses to configure the federated archive RDBMS.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. Those skilled in the art will recognize that many modifications may be made to this configuration without departing from the scope of the present invention.

Those skilled in the art will also recognize that the exemplary computer system illustrated in FIG. 3 is not intended to limit the present invention. Other alternative hardware environments may be used without departing from the scope of the present invention.

Figure 4:
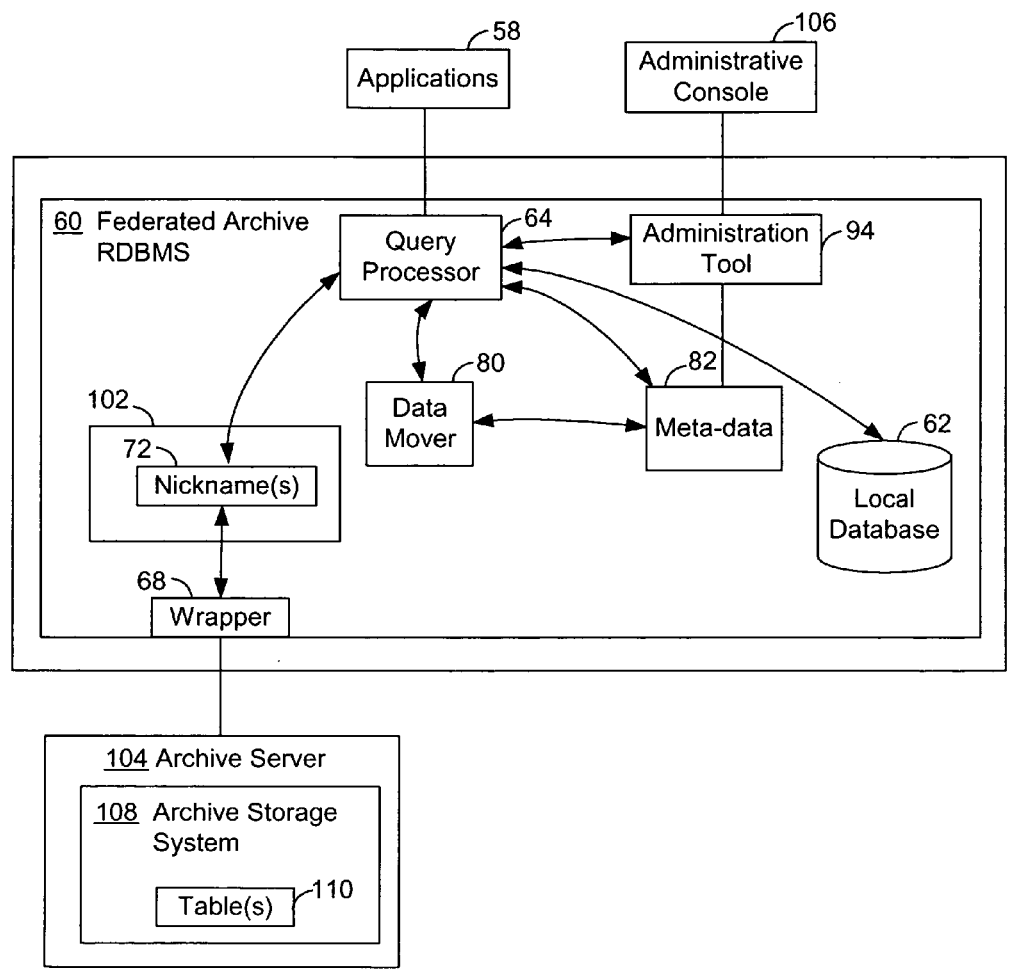
FIG. 4 depicts a first embodiment of a federated archive relational database management system.

FIG. 4 depicts a first embodiment of the federated archive RDBMS 60 that provides federated archive storage. The local database 62 can be accessed directly from the federated archive RDBMS 60, and does not use a nickname or a wrapper. For example, the local database 62 may be used for Online Transaction Processing. The federated archive RDBMS 60 comprises a query processor 64, a data mover 80, meta-data 82, nickname(s) 72, an archive wrapper 68, and a server object 102.

The server object 102 is an object representing one remote data repository, such as the archive server 104, which could be, for example, another RDBMS. The server object 102 also provides a naming scope for the nickname(s) 72.

The archive wrapper 68 provides an interface between the federated archive RDBMS 60 and the archive server 104. Typically, the archive server 104 is remotely located from the federated archive RDBMS 60.

The query processor 64 processes queries from the applications 58, the data mover 80, and the administration tool 94. In one embodiment, the queries are SQL statements. The query processor 64 directly accesses the tables of the local database 62. The query processor 64 accesses the archive storage using the nickname(s) 74. The query processor 64 also accesses the meta-data 82 to determine whether data is stored in the archive server 104. In an embodiment in which the meta-data 82 is stored in database tables, the query processor 64 receives requests from the data mover 80 and the administration tool 94 to access the meta-data 82.

The data mover 80 causes data to be moved from a data source, such as the local database 62, to the archive server 104 in accordance with the specified archiving rules in the meta-data 82. In one embodiment, the data mover 80 generates SQL statements to move the data in accordance with the rules, and passes the SQL statements to the query processor 64 for execution. In another embodiment, the meta-data 82 is stored in at least one database table in the local database 62. In this embodiment, the data mover 80 also accesses the meta-data 82 using SQL statements via the query processor. Alternately, when the meta-data 82 is stored in an array or a file, rather than in database tables, the data mover 80 accesses the meta-data 82 directly. In another embodiment, the meta-data 82 comprises one or any combination of a database table(s), array(s), file(s) and configuration parameter(s).

Referring also to FIG. 3, the meta-data 82 comprises a set of rules 84, configuration information 86, and monitoring, auditing and statistics information 88. At any given time, the meta-data statistics information reflects the location of the data for which archiving rules exist. In one embodiment, the data mover 80 updates the meta-data statistics after each data movement by directly updating the RDBMS catalogs. In some embodiments, the query processor 64 accesses the meta-data 82 to determine whether any data that meets the parameters of the query is stored in the archive server 104, and to determine the location of the data.

A rule specifies what to archive, and when to move data to the archive storage system. For example, a rule may refer to the completion date of a business sale, or to an order status changing from "open" to "completed." Database rows corresponding to these business objects, "sales" and "orders" are moved accordingly. For example, rows from the ORDER table that have the value "completed" for the column "status" are moved to archive storage. In another example, a rule may specify that data is moved to archive storage after ninety days, based on a timestamp column in one of the underlying table for the business object, such as a column containing the data a sale was completed. In yet another example, the federated archive RDBMS applies the following retention rule to the local database:

Move all ORDERS closed over 90 days ago, every night at midnight.

In addition to the data movement criteria, the rule above also specifies scheduling information, that is, when to move the data. Every night at midnight, the data mover will move data from the ORDERS table in the local database that closed ninety days prior to the present date, to the federated archive storage system.

A system administrator at an administrative console 106 uses the administration tool 94 to configure the meta-data 82 for federated archiving. The administration tool 94 is used to specify the rules for archiving data and configuration parameters, if any. In one embodiment, when the meta-data 82 is stored in database tables, the administration tool 104 generates a query to access the meta-data 82 and sends that query to the query processor 64 for execution. In an alternate embodiment, when the meta-data 82 or a portion of the meta-data is not stored in database tables, the administration tool 84 accesses the meta-data 82 directly, rather than using the query processor 64.

The archive server 104 comprises an archive storage system 108 and communicates with the archive wrapper 68 to write data to and retrieve data from the archive database table(s) 110. In one embodiment, the archive storage system 108 is a relational database management system. In another embodiment, the archive storage system is a non-relational data storage system.

The archive storage system 108 comprises any one or a combination of optical storage, for example, a CDROM, tape storage, a hard disk, a hierarchical storage system, and a database management system. In another more particular embodiment, the archive storage system is IBM® Tivoli Storage Manager.

Because the archive storage system 108 is federated into the federated archive RDBMS 60, the data in the archive storage system is accessible via database federation which causes the archived data to appear as if that data still resided in the local database. The federated archive RDBMS transparently decides whether to access the archived data. The data can be accessed using SQL statements; and a single SQL statement can aggregate the data from both the archive storage system 108 and the local database 62.

The components of the federated archive RDBMS will be described in further detail below. The query semantics will now be described.

Query Semantics

Queries from the applications are processed by the query processor. In some embodiments, the query processor also processes queries from the data mover and the administration tool. The query processor has a query interface to receive queries from the applications, and in some embodiments, the data mover and the administration tool. In one embodiment, the query interface comprises one or more SQL statements. In an alternate embodiment, the query interface uses the extensible markup language (XML).

Different embodiments of implementing the query processor for federated archiving to support an SQL query interface will now be described. The query interface may be implemented using at least one or a combination of the following:
(1) Views over nicknames;
(2) Table functions;
(3) System configuration parameter(s);
(4) Extensions to the SQL language that specify a time range; and
(5) The query processor determining whether to access the federated archive in accordance with the set of archiving rules.

In some other embodiments, command-line and graphical query interfaces to the query processor are also provided to retrieve data. The command-line and graphical query interfaces operate atop of the embodiments of the SQL query interface listed above.

Some of the above embodiments allow an application to specify a time span for retrieving data. In alternate embodiments (2) and (4), above, the query specifies the time span and will be described in further detail below. To avoid modifying the query in an application, in embodiment (3), configuration parameters are used to determine how the queries are federated; and, in embodiment (5), another embodiment of the query processor automatically determines whether to access the federated archive in accordance with the set of archiving rules.

The different query interfaces can operate together. Each of the query interfaces may be used in combination with the other query interfaces. For example, configuration parameters (3) may be used with table functions (2) and SQL extensions (4). Views over nicknames (1) may be used with SQL extensions (4) and the query processor determining whether to access the federated archive (5).

The federated archive RDBMS allows fine granularity in specifying which data objects to archive. A data object corresponds to a row or a set of related rows in the database. In some embodiments, the archiving rules identify relationships between these rows. In one embodiment, the smallest database element that can be archived is a subset of a row which comprises a key. For example, an employee record contains a name, identifier, age and salary columns. The federated archive stores the values of the identifier and salary, and stores the other columns with NULL values. When a row is archived, that row is deleted from the data source.

The following describes how federation is provided using an exemplary RDBMS, IBM DB2 Information Integrator. However, the invention is not meant to be limited to IBM DB2 Information Integrator, and other RDBMSs that provide a federation capability may be used. In the following description, the exemplary archive storage system is another relational database management system.

Figure 5:
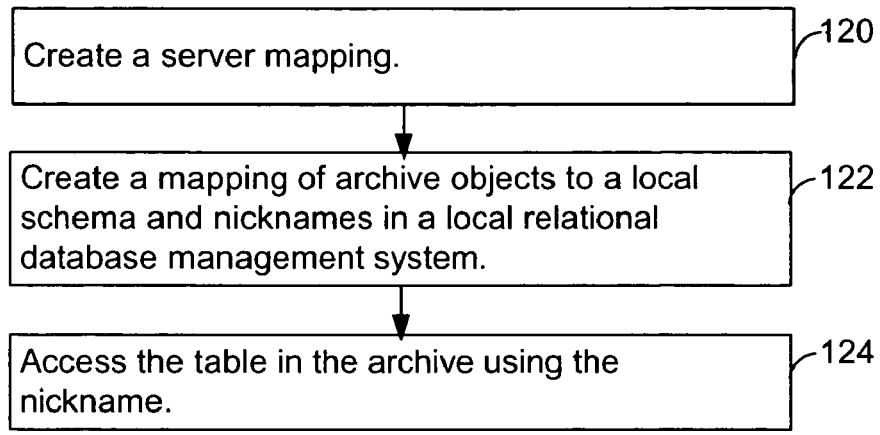
FIG. 5 depicts a flowchart of an embodiment of creating nicknames to the archive storage system, and performing a query.

FIG. 5 depicts a flowchart of an embodiment of creating a nickname to the archive system, and performing a query. In step 120, a server mapping is created. In particular, a server object is created in the local database. In step 122, a mapping of archive objects to a local schema and nicknames in a local relational database management system is created. Given an archiving rule that specifies a particular table in the local database, the federated archive RDBMS creates or reuses a table in the archive storage system that has a structure compatible with that particular table. The nickname is mapped to a database table in the archive storage system that is used for archiving. In alternate embodiments, the nickname maps to other data objects, such as a file in a file storage system, a spreadsheet file, a flat file, an XML document, or a non-relational archive, which may be used as a data source to archive or as an archive. In step 124, the table in the archive storage system is accessed using the nickname.

A more detailed example of creating a wrapper, server object, schema and nickname will now be described. The wrapper is the component that maps data types from a table in the archive storage system to the data types in the local definition of the nickname, transparently accounting for differences between systems. In some embodiments, a wrapper can be created with a DB2 command called "create wrapper." For example, a wrapper, called DRDA, is created as follows:

---
create wrapper DRDA
---

The server object represents a federated data source or target for which nicknames can be created. The server object is created using a DB2 data definition language command called "create server." For example, the create server command creates a server object called UDB as follows:

---
create server UDB type DB2/UDB VERSION 8.1
    WRAPPER DRDA
    OPTIONS    (Node 'ARCHIVE',
               DBNAME 'ARCHIVEDB',
               FOLD_ID 'L',
               FOLD_PW 'L',
               PASSWORD 'Y');
---

The nickname is a database object that provides a local definition of a remote data object, mapping the remote data object to a relation. The nickname is a proxy for a remote set of data that can be mapped to a local table definition, and that are accessed via the wrapper for a particular server. When the archive storage system is another RDBMS, a remote data object is a table in the archive storage system and appears as a local table in the federated archive RDBMS. For example, a local table, called ORDERS, contains purchase orders. Table 1, below, illustrates an exemplary record from the local table ORDERS, with the column name and the associated data type (column name: data type).

TABLE 1

An Exemplary Record
ORDERS (local table)

| Custid: integer | Closedate: time | price: decimal(10,2) |
|---|---|---|
| 101 | May 10, 1999 | 199.20 |

A schema name is created to specify the schema to which a table or view belongs as follows:

create schema ARCHIVE.

Assuming that a table exists in the archive storage system, and using DB2 Information Integrator commands, a nickname to a table in the archive storage system referenced in the create wrapper and create server commands above, and using the schema created above, for the ORDERS table in Table 1, a nickname is created by a "create nickname" command as follows:

create nickname ARCHIVE.ORDERS for UDB.ARCHIVE.ORDERS.

The first parameter "ARCHIVE.ORDERS" is the nickname. The second parameter "UDB.ARCHIVE.ORDERS" is the remote object name. The remote object name has three parts: a data server name, a schema name, and a remote table name. The data server name specifies the data source assigned in the create server statement, for example, "UDB." The schema name specifies the owner of the table on the remote system, for example, "ARCHIVE." The remote table name specifies the name, or an alias of the name, of a table or view, for example, "ORDERS."

Table 2, below, depicts an exemplary nickname definition that was created in response to the create nickname statement above.

TABLE 2

Exemplary Nickname Definition
ARCHIVE.ORDERS

| Custid: integer | closedate: time | price: decimal(10,2) |
|---|---|---|

The nickname, ARCHIVE.ORDERS, appears as a local table, but refers to data that is remote or that, in an alternate embodiment, may not even be stored in a relational database.

A user can retrieve data from the archive by specifying this nickname in queries against the local database. For example, using the ORDERS table and nickname created above for the ORDERS table, the following SQL select statement returns only non-archived orders in the local database:

select * from ORDERS

In another example, the following SQL select statement expressly specifies the nickname of ARCHIVE.ORDERS and returns archived orders from the archive storage system:

select * from ARCHIVE.ORDERS

In yet another example, the following SQL select statement retrieves the values of price from the orders table in the local database and from the associated table in the archive storage system that is referenced by the nickname, archive.orders, and applies a function, sum, to the result of the query as follows:

select sum(orders.price + archives.orders.price)
from orders, archive.orders;

In addition, the data mover moves the data from the ORDERS table in the local database to the associated table in the archive storage system using the nickname.

For each table with at least one associated data movement rule, the federated archive RDBMS has one or a combination of a nickname to the archive storage system, a union view, and a table function, depending on the embodiment. These database objects are created with the same name as the source table, but under a different database schema, which the user can supply. The default schema name for nicknames is the archive server name; for views and table functions, the default schema name is a system default, for example, "IBMFA."

The following illustrates some exemplary database objects. A local table named "SALES" has custid, closedate and price columns. In this example, Table 3, below, illustrates an archiving rule for the closedate column of the SALES table.

TABLE 3

An Exemplary Rule

| Source table: | SALES(custid, closedate, price) |
|---|---|
| Rule: | "Move rows for which closedate > 1 year" |

The federated archive RDBMS creates the following objects on the archive server containing the archive storage system. In this example, the archive storage system is a relational database management system and archive tables are created. Table 4, below, illustrates an exemplary object, that is, an archive table, created on the archive server.

TABLE 4

Object Created on Archive Server

| Object type | Name of Object created | Description |
|---|---|---|
| Archive table: (creates or | ARCHIVE.SALES(custid, closedate, price) | Object into which the archived rows are stored. |

TABLE 4-continued

Object Created on Archive Server

| Object type | Name of Object created | Description |
| --- | --- | --- |
| uses existing) | | In this embodiment, the object is a table; alternately, the object is a file in a Hierarchical Storage Management system. |

The following table, Table 5, depicts the objects created in the federated archive RDBMS using the user-supplied database schema name, "ARCHIVE."

TABLE 5

Objects Created in the Federated archive RDBMS

| Object type | Object created | Description |
| --- | --- | --- |
| WRAPPER | Name depends on the archive type. For example 'DRDA' is a wrapper which supports using any DB2-family database as the archive medium. | Provides the code to transparently retrieve and access data from one type of archive medium. A wrapper is created once per type of archive server. |
| SERVER OBJECT | ARCHIVE | Identify one archive server. The server object is created once per archive server. |
| NICKNAME | ARCHIVE.SALES(custid, closedate, price) | Maps a local table to its remote archive medium. |
| VIEW | IBMFA.SALES(custid, closedate, price) | Union of the data from the local table with the data from the archive. |
| TABLE FUNCTION | ARCHIVE.SALES(goback time, time unit) return table (custid integer, closedate time, price decimal(10,2)) | Retrieve data from archive, if and when needed |

In some embodiments, the VIEW and TABLE FUNCTION objects may not be created.

Using federation, an application can explicitly access archived and local data, merge local data to archived data using a nickname, and issue queries against the nickname.

Views Over Nicknames

Figure 6:
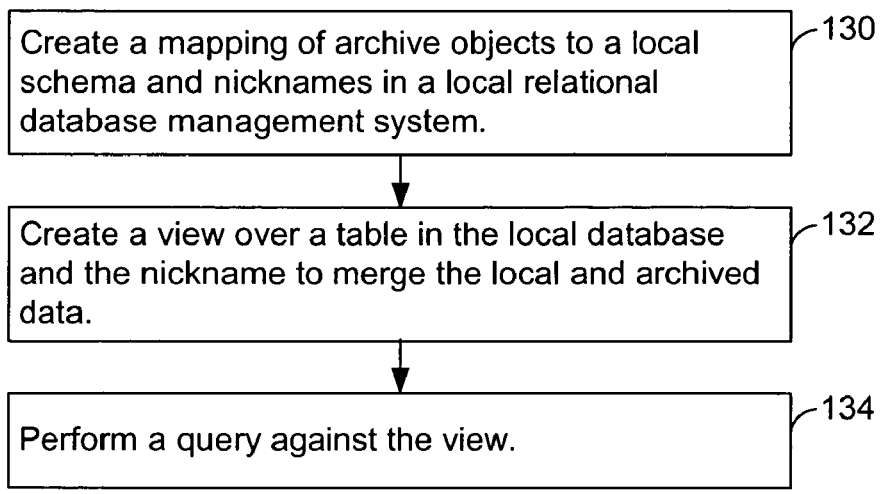
FIG. 6 depicts a flowchart of an embodiment of creating a view to access data stored in the archive storage system.

FIG. 6 depicts a flowchart of an embodiment of creating a view to access the archive storage system. A view is another database object which can be created directly over the nickname to merge local and archived data. In FIG. 6, step 130 is the same as step 122 of FIG. 5 and will not be further described. In step 132, a view is created over a table in the local database and the nickname to merge the local and archived data. For example, the following create statement creates a view called ORDERS_PAST_7YEARS:

```
create view ORDERS_PAST_7YEARS(custid,closedate,price) as
    SELECT custid, closedate, price
    FROM   ARCHIVE.ORDERS
    UNION ALL
    SELECT custid, closedate, price
    FROM   USER1.ORDERS;
```

In step 134, a query is performed against the view. For example, an application may issue a query against the view, ORDERS_PAST_7YEARS, as follows:

```
select * from ORDERS_PAST_7YEARS
```

The above query returns all orders less than seven years old from both the local database and the federated archive storage system.

In another example, when selecting from a view, the user can also specify to "FETCH FIRST 5 ROWS ONLY," which is taken into account by the query optimizer portion of the query processor to determine and select an optimal execution plan. The query optimizer may also be able to avoid accessing archive storage when the predicate specifies an index for which the query optimizer can access statistics in the meta-data. For instance, assume an index on a column called closedate, and that the following query is performed against the view, ORDERS_PAST_7YEARS:

```
select * from ORDERS_PAST_7YEARS
where closedate > current date − 3 months
```

The above query returns all orders that closed in the last three months. In an alternate embodiment, when performing the query, the query optimizer accesses the statistics stored in the meta-data, and based on the statistics, determines that the archive storage system will not be accessed because the archive storage system does not contain any order that closed within the last three months.

Extensions to the SQL Language

In another embodiment, the SQL language is extended to specify a time range. The query interface allows a user to specify a time span, that is, a predicate, with respect to the present time, for both archived and non-archived data to be retrieved. In other words, the query interface allows a user to "go back" in time. In this embodiment, by default, a query without any predicate returns only non-archived data, therefore, applications wishing to include archived data in the result specify how far back in time the query is to be applied. In another embodiment, the query interface also allows a query to place an upper limit on the amount of time to retrieve data from the archive, that is, to specify "STOP AFTER" N seconds.

Table 6, below, illustrates exemplary SQL queries using the "go back" extension, and the result that would be returned from these queries. For the examples in Table 6, the federated archive RDBMS has two federated archive storage systems and a set of rules. A first rule specifies that data is moved from the trades table to the first archive storage system after ninety days. A second rule states that data is moved from the first archive storage system to the second archive storage system after one year. A third rule specifies that data is deleted from second archive storage system after seven years.

Table 6: Exemplary SQL queries using the "go back" extension and the result

TABLE 6

Exemplary SQL queries using the "go back" extension and the result

| Query | Result |
|---|---|
| select trades for user 'user1' | Returns trades from the past 90 days: Select from the local database (In another embodiment, described below, configuration settings may also be used to include archived data in the result). |
| select trades for user 'user1' go back 1 year | Returns trades from the past year: Join data from the first archive storage system and the local database. |
| select trades for user 'user1' go back 7 years | Returns trades going back up to 7 years: Join data from the local database, the first archive storage system and the second archive storage system. |
| select trades for user 'user1' go back 8 years | ERROR: 'Data not available' |
| select trades for user 'user1' go back 2 years fetch first 50 rows only | Returns the first 50 trades found for up to 2 years: Join data sources, as required - apply a progressive search: Search the local database first. If the specified number of rows have not been found, search the first archive storage system. If the specified number of rows have not been found, search the second archive storage system. Search order is based on columns for which there is an archive rule, for example, if the rule is 'closedate > 90 days' then the 50 first rows are sorted by closedate. |
| select trades for user 'user1' go back 7 years fetch first 50 rows only stop after 30 seconds | Returns what was found within 30 seconds. The local database and the archives are searched concurrently, and then the results are merged; Returns no more than 50 rows. |
| update trades set price = 50.0 where price = 100.0 and ticket = 'IBM' go back oldest | Update all qualifying rows in the trades table, in all accessible writeable archives. (For example, the reference financial data in an archive may be updated following a 2/1 stock split). |

In another embodiment, the "go back" extension has a table scope and time interval as arguments.

In one embodiment, the "go back" extension applies to an entire query, that is, all tables. Alternately, the "go back" extension is specified independently for each table in the query. For example, the following query applies a "go back" extension just to the orders table;

```
select c.customer_name, o.number, o.info  --all order info for customer
from orders o go back 5 years,            --from the past 5 years
     customers c        --but, only if customer has not been archived
where c.cust_name = 'user1' and
      c.cid = o.cid;
```

Figure 7:
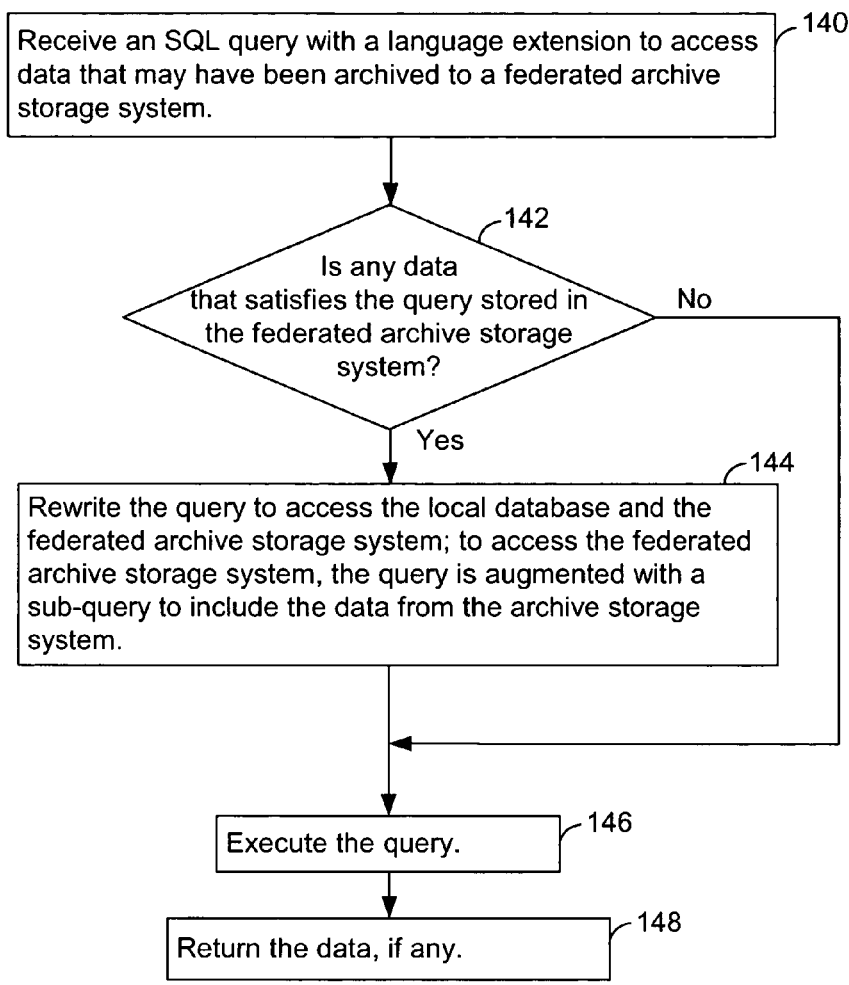
FIG. 7 depicts a flowchart of an embodiment of performing a query using an extension to the SQL language.

FIG. 7 depicts a flowchart of an embodiment of performing a query using an SQL extension. In step 140, the query processor receives a query with an SQL extension to access the federated archive storage system. In one embodiment, the SQL extension is the "go back" extension described above. In step 142, the query processor determines whether any data that satisfies the query is stored in the federated archive storage system. The query processor retrieves the meta-data, in particular, the statistics. Based on the statistics and a time span associated with the "go back" extension, the query processor determines whether any data that satisfies the query is stored in the federated archive storage system. If so, in step 144, the query processor rewrites the query to access the local database and the federated archive storage system. The query is augmented with a sub-query to include the data from the federated archive storage system. In step 146, the query processor executes the query to retrieve a subset of data that satisfies the query. In step 148, the query processor returns the subset of data, if any, that satisfies the query.

If, in step 142, the query processor determined that no data that satisfies the query is stored in the federated archive storage system, in step 146, the query is executed.

Table Functions

In another embodiment, the query interface and query processor functions can be implemented using table functions. A table function is a user defined function that is written in a programming language, for example, the C programming language, comprises SQL calls, and which returns from 0 to N rows. The table functions transparently join archived and non-archived data based on a go back argument supplied by the caller of these functions. The functions determine, based on the meta-data and table function arguments, where and when federation is required.

Figure 8:
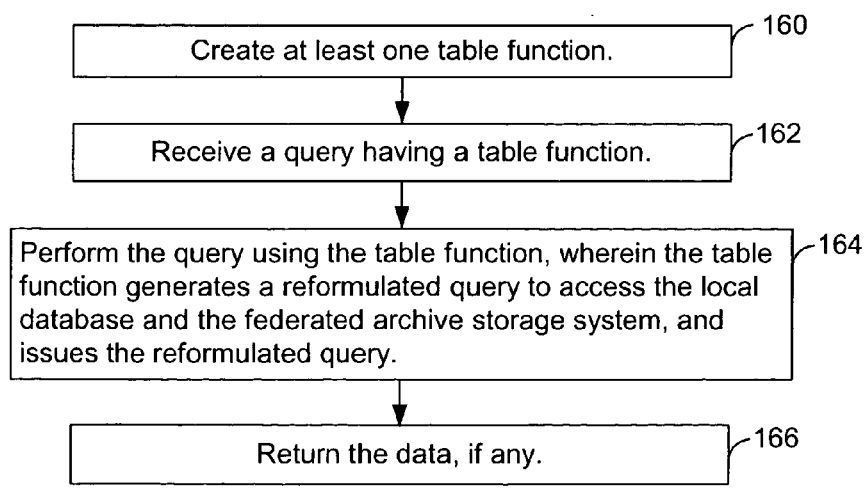
FIG. 8 depicts a flowchart of an embodiment of performing a query using a table function.

FIG. 8 depicts a flowchart of an embodiment of performing a query using a table function. In step 160, at least one table function is created. In step 162, the query processor receives a query having a table function. For example, assume a table function called "myarchive.orders," has a value and a time unit as arguments. An exemplary SQL statement invoking the table function and passing the value and time unit arguments, is shown below:

```
select sum(price) from table(myarchive.orders(80, days))
    as t
```

In the example above, the table function, myarchive.orders (80, days) is requesting ORDERS going back eighty days from the archive storage system.

In step 164, the query processor performs the query using the table function. The table function generates a reformulated query to access the local database and the federated archive storage system and issues the reformulated query. In particular, the table function rewrites the query to include the nicknames, and the federated archive RDBMS performs the access. In step 166, the data retrieved by the query, if any, is returned.

A view can be created over the data using the table functions. For example, a view over data from the past five years is created with a table function as shown below:

```
create view ORDERS_PAST_5YEARS(custid, closedate, price) as
    SELECT * from TABLE(myarchive.orders(5, years))) as t;
```

In another example, to specify a number rows to be retrieved, an additional argument that specifies the number of rows is passed to the table function. For example, to fetch the first N rows, the table function, myarchive.orders, is invoked as follows:

```
select sum(price) from table(myarchive.orders(90, days, 10))
    as t
```

In the table function referenced above, myarchive.orders, the first two arguments are the same as in the previous example. The last argument, ten, specifies the number of rows to retrieve. This query returns the first ten orders it finds, from either the local database or from the federated archive storage system.

In yet another embodiment, a table function may also return after a specified amount of time has elapsed, the specified amount of time could be passed as an argument to the table function.

Configuration Parameters

In another embodiment, configuration parameters are used to determine how the queries are federated. In this embodiment, the application is unaware that information is being retrieved from an archive. In one embodiment, at least a portion of the configuration parameters are part of the configuration information of the meta-data. Alternately, the configuration parameters are stored, at least in part, as part of the RDBMS catalogs. In one particular embodiment, a configuration parameter for the RDBMS or the database is stored in the DB2 catalogs, or in the catalogs for the tools. In another alternate embodiment, at least one configuration parameter is a run-time variable.

For example, in one embodiment, the time span to be applied to a query is controlled by the system administrator via database system configuration, and the time span is stored as configuration information in the meta-data. Therefore, applications can access archive data without being modified. Transparent access to the federated archive can be implemented using a system, session, application or query level configuration parameter.

Figure 9:
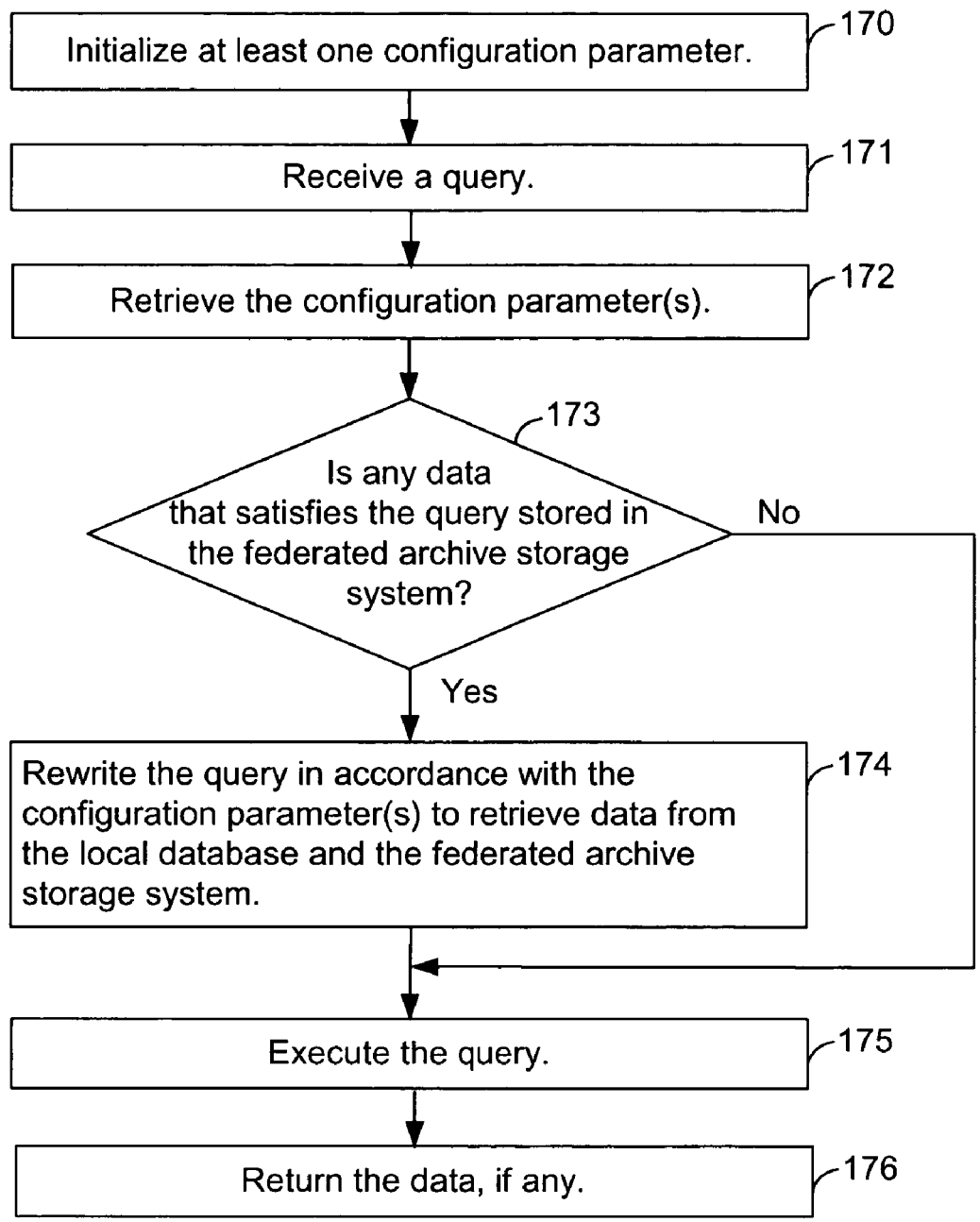
FIG. 9 depicts a flowchart of an embodiment of performing a query for which the decision to include archived data is controlled by at least one configuration parameter.

FIG. 9 depicts a flowchart of an embodiment of performing a query using a at least one configuration parameter. In step 170, at least one configuration parameter is initialized. For example, a configuration parameter specifies how an SQL query is federated. A database-level configuration parameter can be used to enable federation for all queries, all the time, as follows:

```
db2 update db cfg for myDatabase include_archive MYARCHIVE
``` where "MYARCHIVE" is a federated archive server that is known to the federated archive RDBMS.

In step 171, the query processor receives a query. In step 172, the query processor retrieves the configuration parameter(s). In step 173, the query processor determines whether any data that satisfies the query is stored in the federated archive storage system. The query processor retrieves the meta-data, in particular, the statistics, and based on the statistics and the configuration parameter(s), the query processor determines whether any data that satisfies the query is stored in federated the archive storage system. If, in step 173, the query processor determined that data that satisfies the query is stored in the federated archive storage system, in step 174, the query processor rewrites the query in accordance with the configuration parameter(s) to retrieve the data from the local database and the federated archive storage system. Alternately, if the query processor determines that no data to be retrieved by the query is stored in the local database, the query is rewritten in accordance with the configuration parameter(s) to retrieve the data from only the federated archive storage system. In step 175, the query processor executes the query. In step 176, the query processor returns the data, if any.

If, in step 173, the query processor determined that no data that satisfies the query is stored in the federated archive storage system, the query processor proceeds to step 175 to execute the query.

The configuration parameter in the exemplary "db2 update db cfg . . . " statement above changes the behavior of normal SQL queries for all applications to this database to return data from both the local database and the archive storage system(s). For example, when the following SQL select statement is executed:

```
select * from orders where user='user1'
``` orders are returned from both the local database and the archive storage system referred to as MYARCHIVE.

In an alternate embodiment, data from the local database and the archive storage system are aggregated using a view.

A UNION VIEW of a local table and a nickname to a table in the federated archive storage system is created as described above. This union view resides in a different schema.

In yet another embodiment, additional configuration parameters can limit retrieval time by setting a maximum query time.

In another embodiment, the configuration parameter(s) specify to: "fetch both local and archived data for all queries all the time." Alternately, another configuration parameter may specify a time range.

Using configuration parameters allows existing applications to access archived data without changing the applications. Also, if a configuration parameter is specified, for example, at the database level, then that configuration parameter affects all applications using the database.

In another embodiment, a registry variable, another type of configuration parameter, is used to request various levels of federation. The registry variable is specified within an application to request a behavior or function from the relational database management system that applies only to that application. In one embodiment, within the scope of a database connection, a registry variable is used to request various levels of federation, for example, SET ARCHIVE_QUERY_TIME 1 year. When a time-restricting predicate is specified for columns for which archiving rules exist, the query processor automatically determines the location of the data and whether or not the federated archive storage system is accessed to satisfy the query in accordance with the registry variable.

Query Processor Determining Whether to Access the Archive

In yet another embodiment, the query processor determines whether the federated archive storage is to be accessed. In this embodiment, the query processor converts user queries into federated queries to access the archive storage system. In an alternate embodiment, the query processor comprises the set of table functions generated for each archived table and/or a set of generated SQL views.

Figure 10:
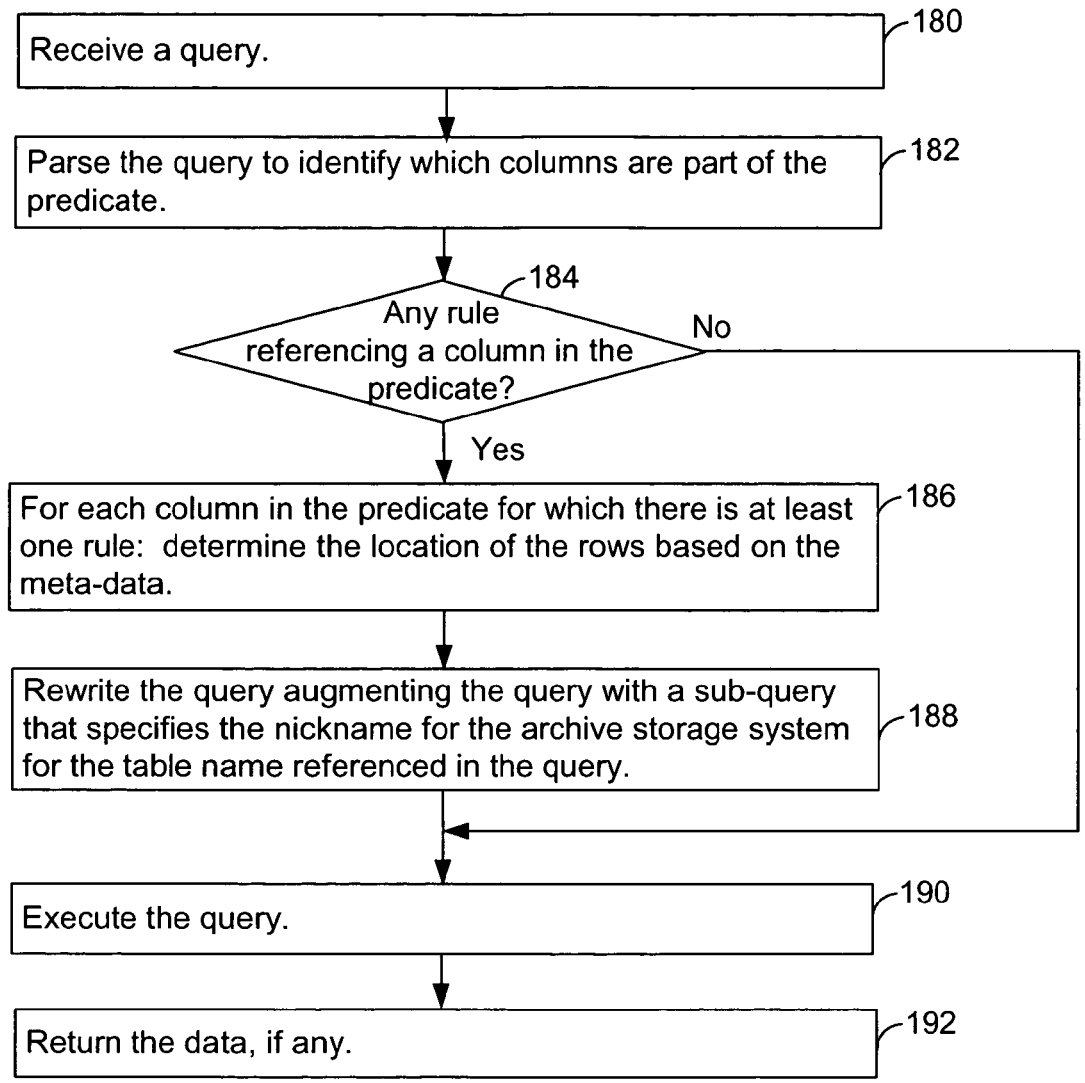
FIG. 10 depicts a flowchart of an embodiment of a technique for the query processor to transparently perform a query of the federated archive based on the meta-data.

FIG. 10 depicts a flowchart of an embodiment of a technique used by the query processor to access the federated archive storage system. In step 180, the query processor receives a query. In step 182, the query processor parses the query to identify which columns comprise the predicate. Step 184 determines if there are any rules referencing a column in the predicate. If so, in step 186, for each column in the predicate for which there is a rule, the query processor determines the oldest row stored in the local database, and determines the location of the rows, that is, whether the rows are stored in the local database or the federated archive storage system. In particular, the meta-data for the location of data depends on the column type. In one embodiment, if the column is an ordered, monotonically increasing type of column, for example, a timestamp, and if there is a rule on this column such as "archive when older than 3 months," then the oldest value that has not been yet been archived is tracked in the meta-data statistics. The data mover causes the query processor to update the meta-data with the oldest value when moving data.

In step 188, the query processor rewrites the query by augmenting the query with a sub-query that specifies the nickname of the archive storage system for the table name referenced in the query. In step 190, the query processor executes the query. In step 192, the query processor returns the data, if any.

If step 184 determines that no rules reference a column in the predicate, the query processor proceeds to step 190 to execute the query against the local database.

For example, the query processor can determine the location of the data for a query such as:

SELECT * from trades where trades.closedate > 'Jan. 01, 1997'

If the year that the query is performed is 2003 and if there is an archiving rule on "closedate"; such as "archive any trade closed for more than 1 year," then the query processor accesses the federated archive to retrieve any data that may be stored. In this example, the federated archive RDBMS transparently combines trades from the local database with data retrieved from the archive storage system before returning the result to the application.

In another example, assume the following archiving rule on closedate:

move sales when closedate non null for over 90 days and the following metadata statistics:

highest value archived for closedate: 'Sep. 30, 2003' on server: 'MYARCHIVE'

The following query is issued on Jan. 1, 2004:

select sum(qty) from sales
    where closedate = (current date − 1 year).

The query processor reads the meta-data to determine whether the federated archive is to be accessed. If no data had been moved to the archive in the past year, the query processor would determine that the federated archive is not accessed.

In another example, the query processor rewrites queries to access the archive storage system using its nickname. The query processor receives the following query:

select from orders
    where status='closed' and closedate < 1995.

The rules for the closedate and status columns are as follows:

rule 1: closedate -
    move to a first archive storage system after 2 years
rule 2: status -
    move to a second archive storage system at 90 days A table in the first archive storage system is associated with a nickname called archiveA.orders, and a table in the second archive storage system is associated with a nickname called archiveB.orders. This query will perform a 3-way join between the local database; and the tables of the first and second archive storage systems. The query processor rewrites this query as:

```
select from orders where status='closed'
UNION ALL
select from archiveA.orders where status='closed'
UNION ALL
select from archiveB.orders where status='closed';
```

In this way, data is transparently retrieved from the local database, the first archive storage system and the second archive storage system.

Updates of Archived Data

In another embodiment, the federated archive RDBMS allows the archived data to be updated. For example, in financial market applications, following a stock split, the positions and holdings may need to be updated even though this data may already have been archived. Updates are issued via the federated archive RDBMS so that the federated archive RDBMS can update the meta-data appropriately. Certain updates may also affect whether the data will be brought back from an archive to the local database. For example, data may be returned to the local database when data is corrected. If a user changes the "closedate" from "ninety days ago" to the "current date," and if an archiving rule specified that data is to archived when the "closedate" is greater than or equal to ninety days, any data that is affected by the change is moved from the archive storage system and returned to the local database.

Monitoring and Auditing

The federated archive RDBMS provides an audit trail of data movements. The audit trail may be written to a file and/or stored in database tables. In one embodiment, for example, the federated archive RDBMS logs the rule that was applied and the number of rows that were moved for each table in a relational table. In another embodiment, the audit trail, and the log of the rules that were applied and the number of rows moved, are part of the monitoring, auditing and statistics information of the meta-data.

Data Mover

As described above, the data mover moves data according to a set of user-defined rules that reflect application semantics and/or the relationship between the data. Applications can query the federated archive RDBMS while data is being moved and a consistent view is provided to the application. The query returns a given row once and only once even if that row is currently being archived. Archiving a row refers to copying a row to the archive storage system, and then physically deleting that row from the data source of that row. The data mover logs the movement of data in the audit trail, and the new location in the meta-data, which is accessed by the query processor to determine the location of data and if a federated archive storage system is accessed to satisfy the query.

Two techniques may be used to move the data. In a first technique, the data is copied to the archive storage system and deleted from the data source in a single transaction. In a second technique, the data is copied to the archive storage system in a first transaction, and then the meta-data is updated to reflect the new location of the data and the data is deleted from the data source in a second transaction.

Figure 11:
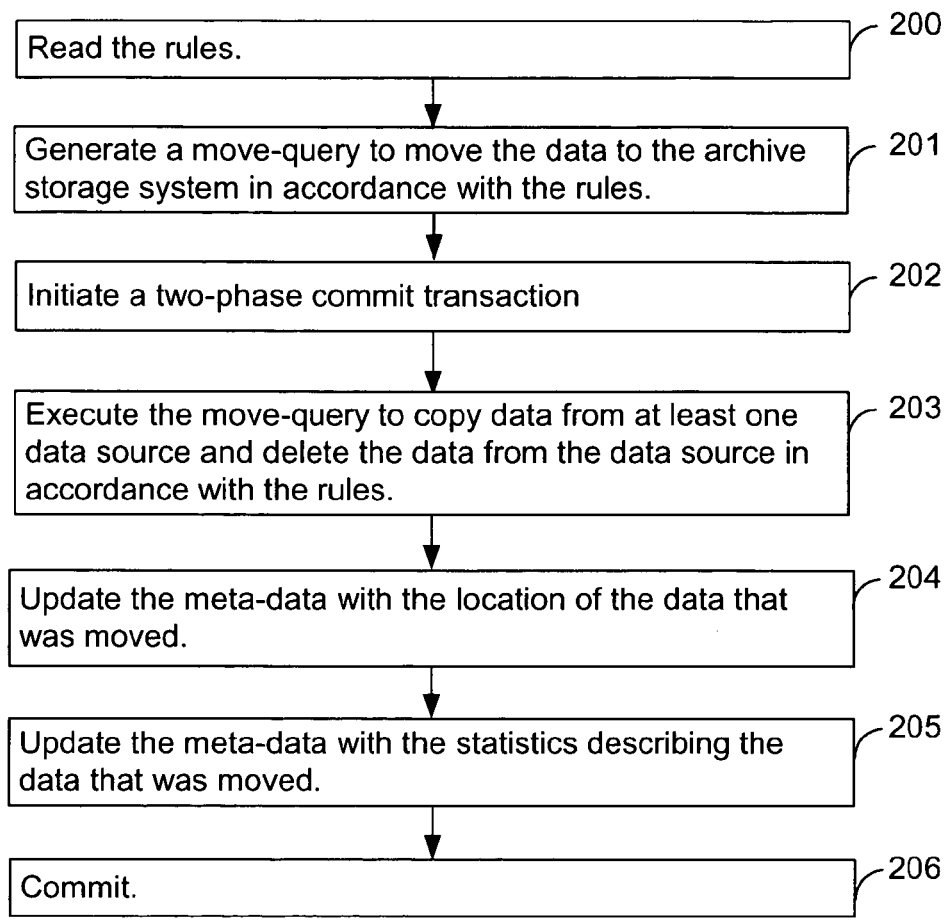
FIG. 11 depicts a flowchart of an embodiment of a technique for use by the data mover in moving data.

FIG. 11 depicts an embodiment of the first technique for use by the data mover in moving data. In step 200, the data mover reads the rules. In step 201, the data mover generates a move-query, which in one embodiment, comprises a set of SQL statements, to move the data from at least one data source to the archive storage system in accordance with the rules. In step 202, the data mover causes the query processor to initiate a two-phase commit transaction between the federated archive RDBMS and the archive storage system. In some embodiments, the two-phase commit processing is provided implicitly by the federated archive RDBMS. In step 203, the data-mover sends the move-query to the query processor. The query processor executes the move-query to copy the data from the data source(s) to the federated archive storage system, and to delete the data from the data source(s). In step 204, the data mover updates the meta-data to reflect the new location of the data. In one embodiment, when the meta-data is stored in database tables, the data mover updates the meta-data through the query processor. In step 205, the data mover updates the meta-data with the statistics describing the data that was moved. In step 206, the data mover has the query processor perform a commit for the transaction. In an alternate embodiment, steps 200 and 201 are performed initially to generate the move-query, and steps 202 to 206 are performed each time the data mover executes.

The first technique prevents rows from appearing simultaneously in both the data source, for example, the local database, and the archive storage system. At any given time, the data appears to reside in one and only one location. To minimize contention when data is moved using two-phase commit, rows are moved in small numbers. In one embodiment, "sub-second" is the criteria for the amount of time allowed for the data mover to hold any locks on the local database. For very large archiving tasks, such as a one-time archive of one year of data, an off-line fast archiving mode is provided. In the off-line fast archiving mode, the local database is quiesced and the rows moved using export, load, and delete.

Figure 12:
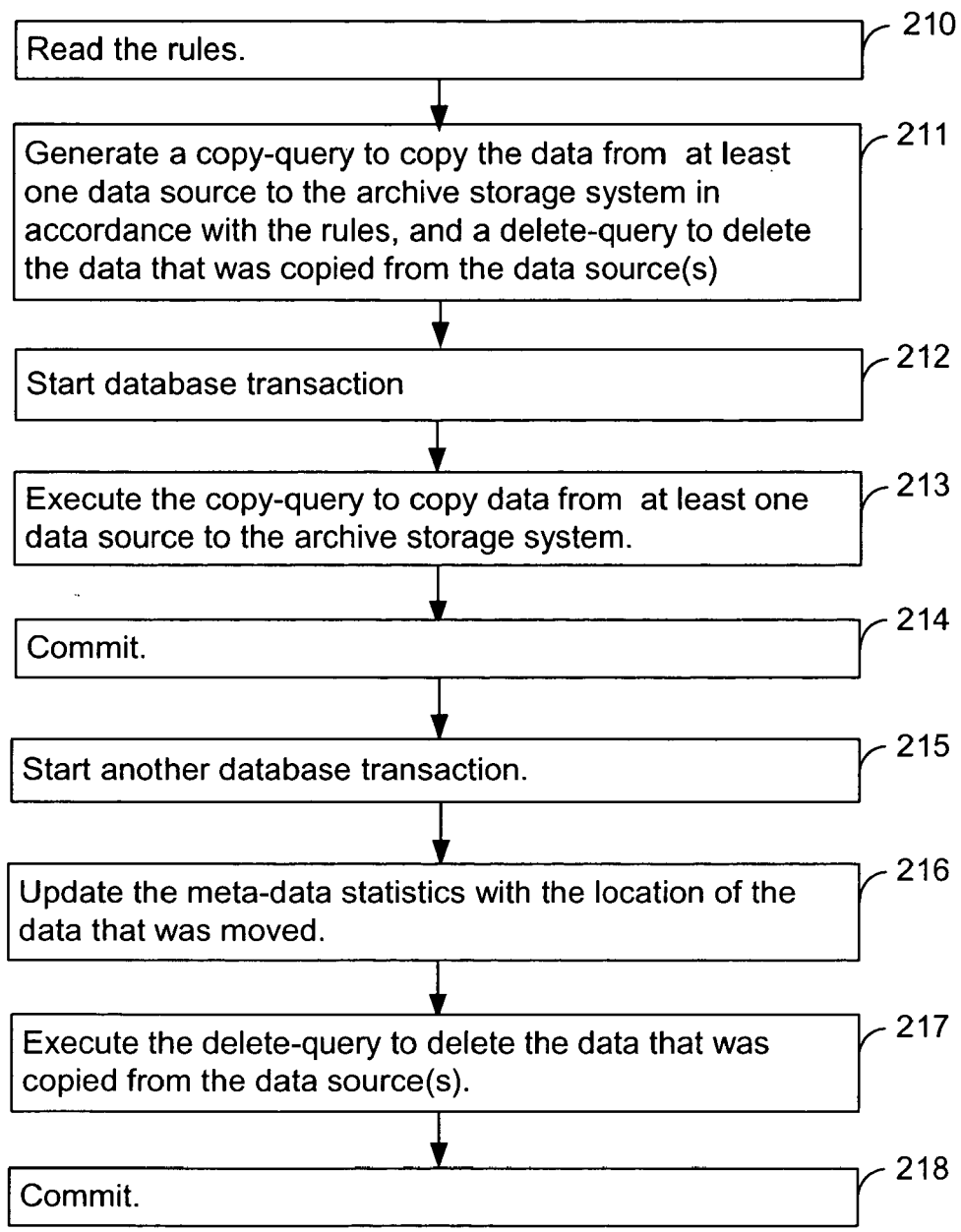
FIG. 12 depicts a flowchart of an embodiment of another technique for use by the data mover in moving data.

FIG. 12 depicts an embodiment of the second technique for use by the data mover for moving data. In step 210, the data mover reads the rules. In step 211, the data mover generates a copy-query to copy data from the data source(s) and write that data to the archive storage system in accordance with the rules, and a delete-query to delete the data that was copied from the data source(s). In step 212, the data mover causes the query processor to start a database transaction. In step 213, in one embodiment, the data mover sends the copy-query to the query processor; and, the query processor executes the copy-query to copy the data from the data source(s) to the federated archive storage system. In step 214, the data mover causes the query processor to perform a commit for the transaction. In step 215, the data mover starts another database transaction with the query processor. In step 216, the data mover updates the meta-data to reflect the new location of the data. In one embodiment in which the meta-data is stored in database tables, the data mover sends SQL statements to the query processor to update the meta-data. In step 217, the query processor executes the delete-query to delete the data that was moved from the data source(s). In one embodiment, the data mover sends the delete-query to the query processor for execution.

In step 218, the data mover causes the query processor to perform a commit for the second transaction. In another embodiment, steps 210 and 211 are performed initially, and steps 212 to 218 are performed each time the data mover executes.

The second technique is used with an embodiment of the query processor which determines whether data is archived by checking the meta-data. In the second technique, queries to the federated archive RDBMS are routed to the query processor so that the rules are accessed to determine the location of the data. The second technique eliminates contention because locks are used for the duration required to update a map of the data in the meta-data according to the set of rules.

The data mover communicates with the query processor via the meta-data. The meta-data reflects the current state of the federated archive RDBMS. For example, if the user selects "sum(sales) where closedate between <'1999-01-01.00.00' and '2000-12-31.00.00'" (i.e., the total of all sales closed in 1999), the query processor automatically searches the federated archive storage system given the predicate and the knowledge that data prior to, for example, '1999-06-01' has already been archived. The data mover maintains statistics about the data that it moves at the rules level. For the exemplary "sum" statement above, if a rule archives data based on the value in the "closedate" column, the query processor accesses the meta-data to determine the maximum value of the column called "closedate." Statistics are stored in a local table in the federated archive RDBMS as part of the meta-data.

In one embodiment, the data mover updates the meta-data each time data is moved, under the same syncpoint as the delete/insert pairs. In this way, the query processor can accurately determine the location of the data at any given time. This embodiment also uses a two-phase commit with the archive storage system.

The data mover can be stopped and restarted at any time. The data mover is stopped and restarted when acquiring new archiving rules.

In one embodiment, the data mover executes continuously. When executing continuously, a "commit_interval" argument determines how often the data mover applies the rules to select which data is moved. The execution of the data mover is stopped with an interrupt.

Alternately, the data mover is launched in "one-time" mode. In the "one-time" mode, the data-mover applies the rules once to select the data to be moved, moves the data, updates the meta-data and stops.

Meta-Data

The meta-data refers to the set of control tables that are shared between the different components of the federated archive RDBMS. The meta-data resides in the federated archive RDBMS. The meta-data comprises the archiving rules, configuration information, and auditing, monitoring and statistics information. In one embodiment, the archiving rules, configuration information, and auditing, monitoring and statistics information are implemented using tables in the federated archive RDBMS.

The configuration information comprises parameters for the data mover, and, in some embodiments, default values for registry variables. In another embodiment, some configuration information is stored in the data dictionary of the relational database management system.

The auditing, monitoring and statistics information is used by the data mover and, in some embodiments, the query optimizer of the query processor to determine the location of data and whether the federated archive storage system will be accessed. In one embodiment, the auditing, monitoring and statistics information is stored in a table for each column specified in each rule for each archive server.

For example, in another embodiment, the statistics are maintained for each column for which there is an archiving rule. The exemplary table below, FEDARC_STATS, maintains statistics as follows:

Table FEDARC_STATS:
For range columns, which are ordered and where the rule is expressed with a "greater or equal" predicate (e.g., closedate > current date = 3 months):
Columns:
SCHEMA_NAME
TABNAME
COLNAME
TARGET_ARCHIVE_SERVER:
TARGET_ARCHIVE_NICKNAME:
LAST_ARCHIVE_TIME
HIGHKEY - highest value that exists for this column on this archive server
LOWKEY - lowest value that exists for this column on this archive server
LOWKEY and HIGHKEY are mutually exclusive.
For equality columns, which define a set (e.g., customer_status and a rule such as 'archive when availability='Discontinued')
RULE_VALUE=Discontinued
TARGET_ARCHIVE_NICKNAME For equality columns, if the value of RULE_VALUE is not NULL, then the data has been moved. If the value of RULE_VALUE is NULL, the data is stored in the local database.

In another embodiment, the meta-data comprises a set of control tables, created under a specified schema, as follows:
1. FEDARC_CONFIG—comprising configuration parameters for the system
2. FEDARC_RULES—comprising, for example, a rule name, table schema, table name, column name, rule, and retention period
3. FEDARC_TABLES—comprising the names of tables for which there is a rule, and archive status
4. FEDARC_COLUMNS—comprising the names of columns for which there is a rule
5. FEDARC_STATS—comprising statistics about each column for which there is a rule
6. FEDARC_SERVERS—comprising the names of the archive servers
7. FEDARC_TRACE—comprising a trace of data movements.

Archiving Rules

Rules identify a set of rows to archive for a given table. In one embodiment, the smallest element that can be archived is one row. At least one rule exists for each table that is to be archived. In another embodiment, default rules are provided for all tables in the local database.

Rules can be combined to specify different retention periods for different subsets of the same table based on different data attributes. For example, a business rule may specify "Move any trade closed over 90 days ago UNLESS the trade is from a preferred customer, in which case keep the trade for 1 year." The data mover may join data from different tables to apply the rule. For example, a customer's status, such as a preferred status, is not in a TRADES table, but in a CUSTOMERS table, therefore the data from the TRADES and CUSTOMERS tables is joined. Applying a rule may even involve querying another system to determine the customer status, for example, invoking a web service. Federation provides a transparent way to access data, wherever the data may reside. In another example, a rule references other tables. A business rule specifies "Archive customer info for any customer that has been inactive (has not purchased anything) for more than 1 year." The database has a CUSTOMERS table and a SALES table. To implement this rule, rows from the CUSTOMERS table may be joined with rows from a SALES table.

Rules can be specified with via a graphical user interface or a command-line interface, which will be described in further detail below. In one embodiment, the rules are stored in relational database tables having an internal format that is optimized for predicate evaluation, for example, as directly executable SQL expressions, in the federated archive relational database management system catalog. For each table, a set of rules can be specified. The rules are combined to determine which rows to move. In another embodiment, the system catalogs are modified to reflect the archiving rules.

Multi-table Rules

A rule may also specify the archiving of rows from several tables as one set, which is referred to as an "archiving group." This allows requesting the archiving of application objects that span several relational tables. For example, an application customer object may include a purchase history and profile, and may be stored in three or four tables. When archiving this application object, the data mover accesses these tables and joins the data based on, for example, a "customer id." For example, an archiving rule may reference several tables as follows:

"Archive purchases, rentals where accounts.closedate>1 year."

Using the above rule, both purchases and rentals are archived for customers that have closed their accounts for more than one year. To satisfy this request, a correlation key is used to join the tables. The administration tool and the command line interface allow a user to specify which column in each table is used as the correlation key.

Rules to Archive a Subset of a Row

In another embodiment, a subset of the row is archived. For example, assume that a local table has a binary large object containing a fax, which is to be archived in an archive storage system, where it is stored as a file. The nickname for this table specifies a key that maps to an index on the archive system for retrieving the file containing the fax. When data is archived, the data stored in any column not defined for archiving is lost. As a result, when data is queried, there may be "holes" in the rows; the archive storage system returns NULLS for column values that are not present in the archive system. In this example, a user could retrieve the fax, but if there were other values in the row associated with the fax, such as purchase amount, those other values are no longer retrievable.

In another embodiment, files that are referenced in a table are archived. For example, if a table has a column containing a filename, both the row and the file may be archived. The data mover moves the values in the table using SQL. The data mover moves the file using other means, for example, the FTP protocol. In this embodiment, the wrapper supports access to remote files.

Rule Syntax

The rule syntax will now be described. Table 8, below, illustrates some exemplary elements of a rule. The left column is an element of a rule, and the right column is a description of that element.

TABLE 8

Exemplary Elements of a Rule

| Element of Rule | Description |
| --- | --- |
| Source: | A view or table |
| Target: | Target Server: A database or the name of a federated server |
| | Target Table: A table, updateable view, nickname or NULL (i.e., delete the data) |
| Archive | Set of: |
| Condition: | Predicate: condition to evaluate (e.g., status = 'closed') |
| | Retention Period: How long to keep the data after the condition is true (e.g., 90 days) |
| | Timestamp Column: Column (or as-of clause) from which to calculate the retention period (e.g., closedate timestamp) OPTIONAL |
| | Description: Short text commenting the rule. |
| Schedule: | When to apply the rule: continuously or at a specific (repeating) time, for example, every night at 6:00 PM. Default is continuously |

The archive condition comprises a set of predicates, in which each predicate is an annotated SQL clause identifying a column from the table to archive and a condition. The archive condition also comprises a retention period, an optional timestamp, and an optional description. The commands and graphical user interface (GUI) wizard can be used to construct syntactically correct predicates, and display the resulting combined condition as it is constructed. The system validates a rule when the rule is added. The predicate allows arbitrary operations. For example, a rule can include a count( ) that triggers archiving when the database reaches a predetermined size limit.

A rule that references multiple tables also uses a correlation column to store the correlation key. For example, a local database has a SALES table and a CUSTOMERS table. Table 9 depicts the SALES table, and Table 10 depicts the CUSTOMERS table.

TABLE 9

Exemplary SALES table
SALES

| Custid | Closedate | price |
| --- | --- | --- |
| 101 | Null | 10.99 |
| 101 | 2001-01-01 | 200.00 |
| 102 | 2003-03-17 | 10000000.00 |

TABLE 10

Exemplary CUSTOMERS table
CUSTOMERS

| Custkey | Name | status |
|---------|------|--------|
| 101 | Bourbon | Preferred |
| 102 | Whiskey | Regular |

The following are the archive conditions:
1. "Move SALES when closedate is over 90 days UNLESS the customer has preferred status or the sales was over $1000000 to ARCHWE1".
2. "Move CUSTOMERS that have not bought anything for over a year to ARCHIVE2".
3. "Move oldest INVOICES when the table exceeds 50 million rows (perform this once a month)".
4. "Move PRODUCTS when discontinued immediately to ARCHIVE3".

FIG. 13 illustrates an exemplary rules table containing a set of archiving rules 220 that were generated from the archiving conditions shown above. For convenience, the column name is shown at the top of each column. In practice, the rules table may not store the column names as shown. The rules table 220 comprises a rule name column 221, a table name column 222, a predicate column 223, a correlation column 224, a timestamp column 225, a retention period column 226, a schedule column 227, a target server column 228 and a description column 229. Alternately, the description column 229 is not used.

Archiving condition one, above, is specified by rules R1, R2 and R3 of FIG. 13. Archiving condition two, above, is specified by rule R4 of FIG. 13. Archiving condition three, above, is specified by rule R5 of FIG. 13. Archiving condition four, above, is specified by rule R6 of FIG. 13.

In FIG. 13, in the rules, the columns from the source table are annotated by enclosing the columns in square brackets. Each clause of the archive conditions is specified as a separate rule to facilitate the specification of complex conditions. The clauses for each local table are combined using "AND" within each retention period, and with "NOT IN" for the clauses having a longer retention period. For example, the data mover may generate an exemplary move-query using SQL statements as follows:

```
Move the 90-day candidates from the SALES table:
    -- 'move' rows from sales s
    insert into ARCHIVE1.SALES
    select * from SALES s
    where
        -- rule R1
        (s.closedate is not null and s.closedate > 90 days)AND
        -- Combine rules R2 and R3: Excluding the rows
        -- that qualify for rules with a longer retention
        -- period:
        not s.custid in (select c.ckey from customers c
            where c.status='preferred') and
            price > 1000000)
    delete from SALES s
    where
        -- rule R1
        (s.closedate is not null and s.closedate > 90 days)AND
        not s.custid in (select c.ckey from customers c
            where c.status='preferred') and
            price > 1000000)
commit
```

Additional SQL statements are generated by the data mover for the 365-days and 5-years rules, and for the rules for the INVOICES and PRODUCTS tables.

In FIG. 13, the target server column 228 allows a target archive storage system to be specified in those configurations having multiple archive storage systems. When the target server is NULL, a predefined default target server, for example, ARCHIVE1, will be accessed.

Given the set of rules in FIG. 13, the minimum retention period for the SALES table is one day and the maximum retention period is five years. In one embodiment, a query accesses the federated archive if the "go back" value is greater than the minimum retention time. For example, the following SQL statement specifies a "go back" value that is equal to 100 days:

```
select * from sales go back 100 days where c.custid=101
```

This select joins data from both the local database and the archive storage system, even though the customer record with custid equal to 101 is a preferred customer, whose SALES data was not moved to archive storage.

Administration and System Interface

The administration tool comprises a Graphical User Interface (GUI) and a command line interface for installation and configuration. The administration tool can set up an archive server, for example, install software components and create databases, configure federation and create nicknames, and create the meta-data. The administration tool also assists programmers in using the query interface by providing wizards and commands to explore available archives and functions. In another embodiment, an application-programming interface (API) is also provided.

Command Line Interface

In the command line interface, a command line interpreter supports administrative commands. In this specification, the command line interpreter is referred to as "ibmfa." The following exemplary commands are used to query system objects. The "ibmfa list nicknames [server]" command lists the nicknames for a given or all archive servers. The "ibmfa list archives" command lists the names of the archive servers. The "ibmfa list rules [dbname]|[tabname]" command returns a formatted list of the archiving rules for a table or database. A command to list the federated views may also be provided. Another command, "ibmfa mover dbname" executes the data mover. Rules can be added to the rules table as follows:

```
ibmfa addrule archiveName rulename tabschema.tabname.colname
    pred="string" retain="duration" desc="string"
```

In another embodiment, as a rule is added, the command line interpreter validates the predicate string.

The following rule removes a rule from the rules table.

---
ibmfa droprule archiveName rulename
---

In one embodiment, data previously archived in accordance with a rule that was removed is not restored.

Commands are also provided to retrieve data from or move data to archive storage from a command line in accordance with the set of rules. The following is an exemplary command to retrieve data from archive storage.

---
ibmfa restore localschema.tabname go back 2 years
---

The exemplary "ibmfa restore . . . " command, above, restores rows that were archived during the past two years from archive storage, and reinserts the rows into the source table. Rows that cannot be reinserted, for example, because they would violate a referential integrity constraint, are inserted into an exception table. The "ibmfa restore . . . " command is intended to be used after dropping the rules that caused the data to be archived.

Cascaded Federated Archive Storage System

Figure 14:
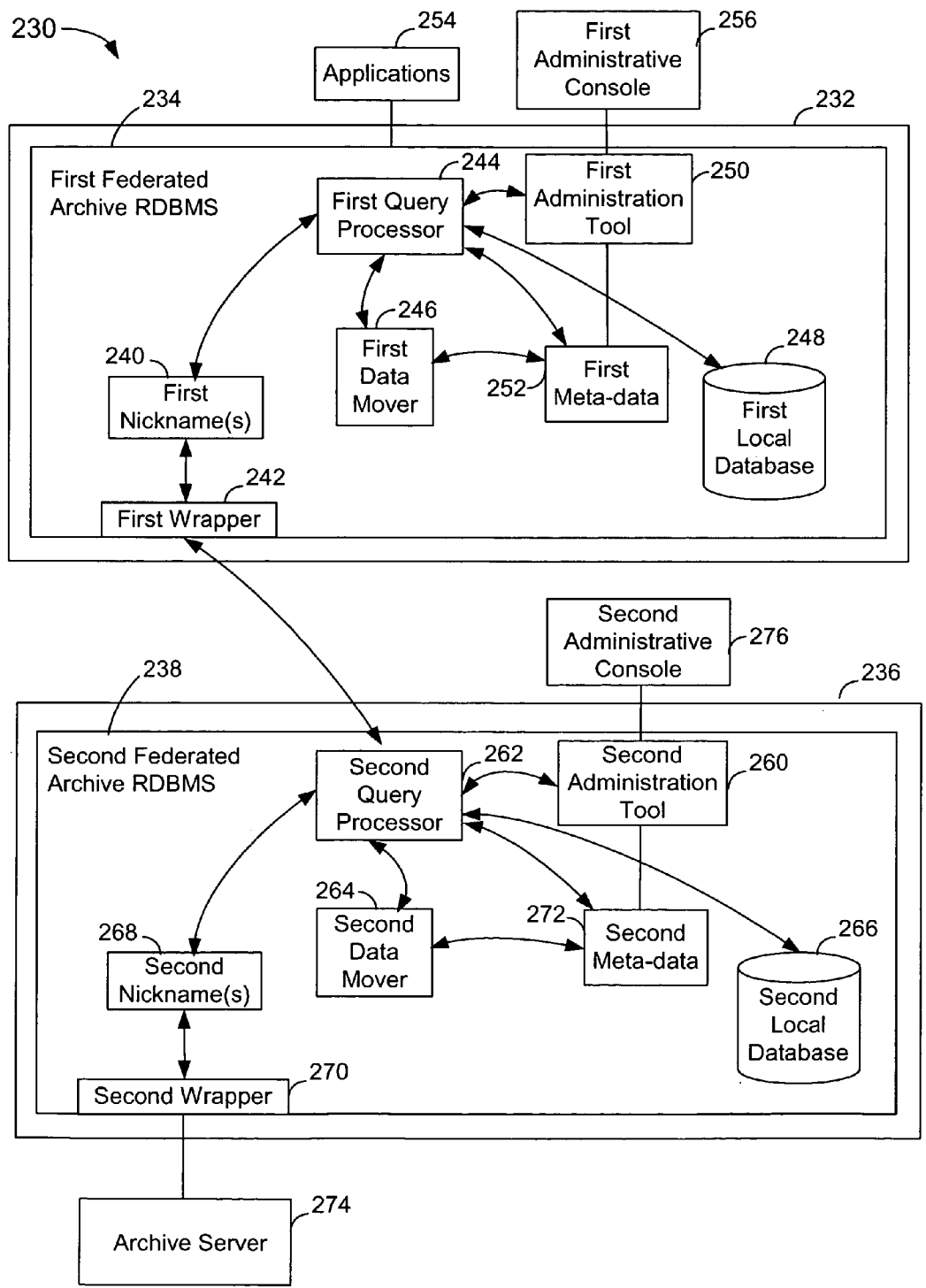
FIG. 14 depicts an embodiment of a cascaded federated archive relational database management system.

FIG. 14 depicts an embodiment of a cascaded federated archive storage system 230. In this embodiment, a first computer system 232 comprises a first federated archive RDBMS 234 and a second computer system 236 comprises a second federated archive RDBMS 238. The first federated archive RDBMS 234 communicates with the second federated archive RDBMS 238 using first nicknames 240 and a first wrapper 242 in the first federated archive RDBMS 234. The first federated archive RDBMS 234 also comprises a first query processor 244, a first data mover 246, a first local database 248, a first administration tool 250 and first meta-data 252. As described above with respect to FIG. 3, the first meta-data comprises first rules, first configuration information and first monitoring, auditing and statistics information. First applications 254 communicate with the first federated archive RDBMS 234. A first administrative console 256 communicates with the first administration tool 250 to update the first meta-data 252.

The second federated archive RDBMS 238 has a second administrative tool 260, a second query processor 262, a second data mover 264, a second local database 266, second nicknames 268, a second wrapper 270, and second meta-data 272. As described above with respect to FIG. 3, the second meta-data 272 comprises second rules, second configuration information and second monitoring, auditing and statistics information. The second wrapper 270 communicates with a second archive server 274. A second administrative console 276 communicates with the second administration tool 260 to update the second meta-data 272.

In the cascaded federated archive storage system 230, the first and second query processors, 244 and 262, respectively, may be implemented, and data may be queried, using any of the embodiments and/or techniques described above for a query processor. The embodiments and techniques described above for a federated archive RDBMS may be also used in the first and second federated archive RDBMS's, 234 and 238, respectively. In addition, the embodiments and techniques described above for a data mover, local database, administration tool, administrative console, nickname(s), wrapper and meta-data may be implemented and/or used in the first data mover 244, first local database 248, first administration tool 250, first administrative consoles 256, first nickname(s) 240, first wrapper 242 and first meta-data 252, respectively. In addition, the embodiments and techniques described above for a data mover, local database, administration tool, administrative console, nickname(s), wrapper and meta-data may be implemented and/or used in the second data mover 264, second local database 266, second administration tool 260, second administrative console 276, second nickname(s) 268, second wrapper 270 and second meta-data 272, respectively. The archive server 274 comprises any of the archive storage systems described above.

When archiving data, the first data mover 246 moves a first subset of data from the first federated archive RDBMS 234 to the second federated archive RDBMS 238 via the first wrapper 242. In one embodiment, the first data mover causes the first query processor to send a set of SQL statements to write the data, and the data to the second federated archive RDBMS 238. In the second federated archive RDBMS 238, the second query processor 262 receives the SQL statements and the first subset of data from the first wrapper 242, and stores the first subset of data in the second local database 266 in accordance with the second rules in the meta-data 272. In another embodiment, the second query processor 262 stores the first subset of data in the second local database 266, and the second data mover 264 moves at least a portion of the first subset of data to the archive server 274 in accordance with the rules in the second meta-data 272.

In another alternate embodiment, any number of federated archive RDBMS's are cascaded. For example, the second federated archive RDBMS may be coupled to a third federated archive RDBMS, rather than the archive server 274.

Multiple Federated Archive Servers

Figure 15:
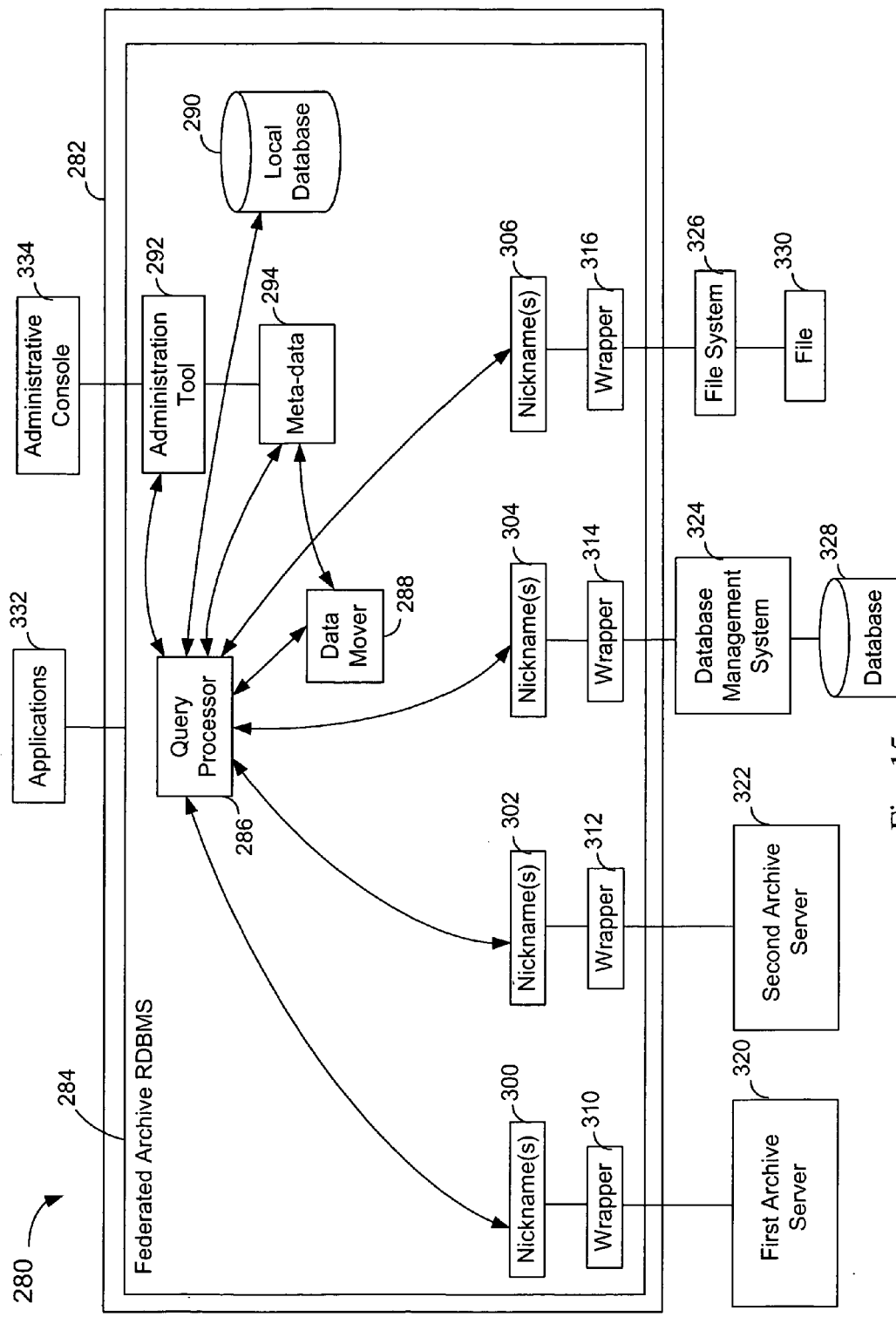
FIG. 15 depicts an embodiment of a federated archive relational database management system having first and second archive storage systems in a heterogeneous environment.

FIG. 15 depicts an embodiment of a federated archive RDBMS having multiple archive servers in a heterogeneous environment 280. In a computer system 282, a federated archive RDBMS 284 comprises a query processor 286, data mover 288, local database 290, administration tool 292, and meta-data 294. As described above with reference to FIG. 3, the meta-data 294 comprises rules, configuration information, and monitoring, auditing and statistics information. The federated archive RDBMS 284 also has first, second, third and fourth nickname(s), 300, 302, 304 and 306, communicating through first, second, third and fourth wrappers, 310, 312, 314 and 316, to a first archive server, a second archive server, a second relational database management system and a file system 320, 322, 324 and 326, respectively. The second relational database management system 324 has a database 328 comprising one or more tables. The file system 326 has at least one file 330 which may be, for example, a flat file or a spreadsheet. Applications 332 query the federated archive RDBMS 284 through the query processor 286. A system administrator at an administrative console 334 uses the administration tool 292 to configure the meta-data 294.

In the multiple archive server configuration 280, the query processor 286 may be implemented, and data may be queried, using any of the embodiments and/or techniques described above for a query processor. The embodiments and techniques described above for a federated archive RDBMS may be also used in the federated archive RDBMS 284. In addition, the embodiments and techniques described above for a data mover, local database, administration tool, administrative console, nickname(s), wrappers and meta-data may be implemented and/or used in the data mover 288, local database 290, administration tool 282, administrative console 334, nicknames 300-306, wrappers 310-316, and meta-data 294, respectively.

The first and second archive servers, 320 and 322, comprise any of the first and second archive storage systems, respectively. The first and second archive servers 320 and 322, respectively, may be implemented using any of the embodiments for the archive server 104 of FIG. 4, described above. The first and second archive storage systems of the first and second archive servers, 320 and 322, respectively, may be implemented using any of the embodiments for the archive storage system 108 of FIG. 4, described above.

In another embodiment, the first archive storage system of the first archive server 320 comprises a relational database management system with hard disk drive storage, and the second archive storage system of the second archive server 322 comprises optical storage. In alternate embodiments, the first and second archive storage systems of the first and second archive servers, 320 and 322, respectively, may comprise hard disk drives, optical storage, tape storage, a hierarchical storage system or a document management system. In another alternate embodiment, the first and second archive storage systems of the first and second archive servers, 320 and 322, respectively, can be another federated archive RDBMS as illustrated in FIG. 14. In other embodiments, more than two archive servers are used.

In another embodiment, the data mover 288 extracts data from the first archive server 320 and stores that data on the second archive server 322 in accordance with the rules. For example, if the first archive server 320 has a large amount of data, a smaller second archive 322 can be provided by extracting a subset of data from the first archive server 320 and storing it in the second archive server 322 according to the set of archiving rules in the meta-data 294.

In another embodiment, the rules specify that different data is stored on the first and second archive servers, 320 and 322, respectively. For example, the first and second archive servers, 320 and 322, respectively, may archive data from different tables in the local database 290.

In yet another embodiment, the rules specify that older data is moved from the first archive server 320 to the second archive server 322. For example, the rules may specify that data is moved from the local database 290 to the first archive server 320 after ninety days, and that data is moved from the first archive server 320 to the second archive server after one year 322.

In another embodiment, the data mover 288 archives data from at least one federated data source in accordance with the rules. For example, the rules may specify that data from the second relational database management system 324 is moved to the first archive server 320 after six months. In another example, the rules may specify that data from the file 330 is moved to first archive server 320 after three months.

In yet another embodiment, the federated archive RDBMS with multiple archive servers 280 is cascaded as the second federated archive RDBMS 238 of FIG. 14.

The federated archive RDBMS of the present invention allows applications that use a relational database to receive the benefits of data archiving, such as smaller data sets and therefore improved response time, while being able to access the archived data as if the archived data was stored in a local database. The applications can also use standard SQL, and therefore are able to combine both archived and non-archived data in the same SQL query. Data can be queried and will appear as if the data resides in a single storage system at any given time, even when the data is being or has been moved.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A computer-implemented method of transparently archiving data stored in one or more first data sources of a federated relational database management system, comprising:

storing a first set of rules in the federated relational database management system, the first set of rules being stored in a data structure, the first set of rules comprising at least one rule, said at least one rule comprising a specified data source of said one or more first data sources, a specified archive target, a specified predicate, a specified timestamp, a specified retention period, and a specified archiving schedule, the specified predicate being a condition to evaluate, the specified retention period specifying a duration of time to retain data that satisfies the condition, the specified timestamp specifying a column of said specified data source comprising a time from which to calculate a particular retention period based on the specified retention period of the data that satisfies the condition;

reading, by a first data mover, the first set of rules that is stored in the data structure, wherein the specified data source, the specified archive target, the specified predicate, the specified timestamp, the specified retention period and the specified archiving schedule are read;

generating, by the first data mover, at least one command to move a first subset of data from the one or more first data sources to a first federated archive in accordance with the first set of rules, a particular command of said at least one command being generated to move data from the specified data source to the specified archive target based on the specified predicate, the specified timestamp and the specified retention period; and moving, by the first data mover by causing the at least one command to be executed, the first subset of data from the one or more first data sources to the first federated archive in accordance with the first set of rules, wherein the particular command is executed in accordance with the specified archiving schedule.

2. The method of claim 1 further comprising:

moving, by the first data mover, a second subset of data from the first federated archive to a second federated archive in accordance with the first set of rules.

3. The method of claim 1 wherein the first federated archive is coupled to a second federated archive, wherein the second federated archive is cascaded with the first federated archive, further comprising:

moving, by a second data mover at the second federated archive, at least a portion of the first subset of data to the second federated archive in accordance with a second set of rules.

4. The method of claim 1 further comprising:

processing a query to retrieve a second subset of data, wherein a first portion of the second subset of data is retrieved from the first federated archive.

5. The method of claim 4 wherein said processing comprises determining whether any subset of data that would satisfy the query is stored in the first federated archive.

6. The method of claim 4 further comprising:
creating a view over at least one of the one or more first data sources and the first federated archive;
wherein said processing comprises processing the query using the view to aggregate the second subset of data from the at least one of the one or more first data sources and the first federated archive.

7. The method of claim 4 wherein said processing comprises invoking a table function to retrieve the first portion of the second subset of data from the first federated archive.

8. The method of claim 1 further comprising:
receiving a query that specifies a time range from which to retrieve data; and
processing the query to retrieve data from the first federated archive based on the time range.

9. The method of claim 1 further comprising:
receiving a query to retrieve a second subset of data;
determining whether a portion of the second subset of data requested by the query is stored in the first federated archive; and
retrieving the portion of the second subset of data from the first federated archive.

10. The method of claim 9 further comprising:
updating meta-data indicating a location of the data, and wherein said determining whether the portion of the second subset of data requested by the query is stored in the first federated archive is based on the meta-data.

11. The method of claim 1 further comprising:
updating at Least one configuration parameter;
receiving a query; and
processing the query to retrieve a second subset of data from the first federated archive in accordance with the at least one configuration parameter.

12. The method of claim 1 wherein at least one rule from the first set of rules associates a predicate with a retention period on a table in the one or more first data sources and is combined with another rule to express a dependency between a different table in the one or more first data sources.

13. The method of claim 1 further comprising:
updating a value of a portion of the first subset of data in the first federated archive.

14. The method of claim 1 wherein the archiving schedule comprises one of performing archiving continuously and a specified archiving time.

15. An apparatus for transparently archiving data of a federated relational database management system, comprising:
a computer coupled to one or more first data sources and also to a first federated archive; and
one or more computer programs embodied on a computer readable storage medium performing:
storing a first set of rules in the federated relational database management system, the first set of rules being stored in a data structure, the first set of rules comprising at least one rule, said at least one rule comprising a specified data source of said one or more first data sources, a specified archive target, a specified predicate, a specified timestamp, a specified retention period, and a specified archiving schedule, the specified predicate being a condition to evaluate, the specified retention period specifying a duration of time to retain data that satisfies the condition, the specified timestamp specifying a column of said specified data source comprising a time from which to calculate a particular retention period based on the specified retention period of the data that satisfies the condition;
reading, by a first data mover, the first set of rules that is stored in the data structure, wherein the specified data source, the specified archive target, the specified predicate, the specified timestamp, the specified retention period and the specified archiving schedule are read;
generating, by the first data mover, at least one command to move a first subset of data from the one or more first data sources to the first federated archive in accordance with the first set of rules, a particular command of said at least one command being generated to move data from the specified data source to the specified archive target based on the specified predicate, the specified timestamp and the specified retention period; and
moving, by the first data mover by causing the at least one command to be executed, the first subset of data from the one or more first data sources to the first federated archive in accordance with the first set of rules, wherein the particular command is executed in accordance with the specified archiving schedule.

16. The apparatus of claim 15 wherein the computer is coupled to a second federated archive, and said one or more computer programs embodied on a computer readable storage medium are also performing:
moving, by the first data mover, a second subset of data from the first federated archive to the second federated archive in accordance with the first set of rules.

17. The apparatus of claim 15 wherein the first federated archive is coupled to a second federated archive, wherein the second federated archive is cascaded with the first federated archive, and said one or more computer programs embodied on a computer readable storage medium are also performing:
moving, by a second data mover at the second federated archive, at least a portion of the first subset of data to the second federated archive in accordance with a second set of rules.

18. The apparatus of claim 15 wherein said one or more computer programs embodied on a computer readable storage medium are also performing:
creating a view over at least one of the one or more first data sources and the first federated archive; and
processing a query to retrieve a second subset of data using the view, wherein a first portion of the second subset of data is retrieved from the first federated archive, and the view aggregates the second subset of data from the at least one of the one or more first data sources and the first federated archive.

19. The apparatus of claim 15 wherein the one or more computer programs embodied on a computer readable storage medium are also performing:
receiving a query to retrieve a second subset of data;
determining whether a portion of the second subset of data requested by the query is stored in the first federated archive; and
retrieving the portion of the second subset of data from the first federated archive.

20. The apparatus of claim 19 wherein the one or more computer programs embodied on a computer readable storage medium are also performing:
updating meta-data indicating a location of the data, and wherein said determining whether the portion of the second subset of data requested by the query is stored in the first federated archive is based on the meta-data.

21. An article of manufacture comprising a computer readable storage medium embodying one or more instructions that are executable by a computer to perform transparently archiving data stored in one or more first data sources of a federated relational database management system, comprising:

storing a first set of rules in the federated relational database management system, the first set of rules being stored in a data structure, the first set of rules comprising at least one rule, said at least one rule comprising a specified data source of said one or more first data sources, a specified archive target, a specified predicate, a specified timestamp, a specified retention period, and a specified archiving schedule, the specified predicate being a condition to evaluate, the specified retention period specifying a duration of time to retain data that satisfies the condition, the specified timestamp specifying a column of said specified data source comprising a time from which to calculate a particular retention period based on the specified retention period of the data that satisfies the condition;

reading, by a first data mover, the first set of rules that is stored in the data structure, wherein the specified data source, the specified archive target, the specified predicate, the specified timestamp, the specified retention period and the specified archiving schedule are read;

generating, by the first data mover, at least one command to move a first subset of data from the one or more first data sources to a first federated archive in accordance with the first set of rules, a particular command of said at least one command being generated to move data from the specified data source to the specified archive target based on the specified predicate, the specified timestamp and the specified retention period; and moving, by the first data mover by causing the at least one command to be executed, the first subset of data from the one or more first data sources to the specified target of the first federated archive in accordance with the first set of rules, wherein the particular command is executed in accordance with the specified archiving schedule.

22. The article of manufacture of claim 21, further comprising:

moving, by the first data mover, a second subset of data from the first federated archive to a second federated archive in accordance with the first set of rules.

23. The article of manufacture of claim 21 wherein the first federated archive is coupled to a second federated archive, wherein the second federated archive is cascaded with the first federated archive, further comprising:

moving, by a second data mover at the second federated archive, at least a portion of the first subset of data to the second federated archive in accordance with a second set of rules.

24. The article of manufacture of claim 21, further comprising:

processing a query to retrieve a second subset of data, wherein a first portion of the second subset of data is retrieved from the first federated archive.

25. The article of manufacture of claim 24 wherein said processing comprises determining whether any subset of data that would satisfy the query is stored in the first federated archive.

26. The article of manufacture of claim 24, further comprising:

creating a view over at least one of the one or more first data sources and the first federated archive, wherein said processing comprises processing the query using the view to aggregate the second subset of data from the at least one of the one or more first data sources and the first federated archive.

27. The article of manufacture of claim 24 wherein said processing comprises invoking a table function to retrieve the first portion of the second subset of data from the first federated archive.

28. The article of manufacture of claim 27, further comprising:

updating meta-data indicating a location of the data; and wherein said determining whether the portion of the second subset of data requested by the query is stored in the first federated archive based on the meta-data.

29. The article of manufacture of claim 21, further comprising:

receiving a query that specifies a time range from which to retrieve data; and processing the query to retrieve data from the first federated archive based on the time range.

30. The article of manufacture of claim 21, further comprising:

receiving a query to retrieve a second subset of data;

determining whether a portion of the second subset of data requested by the query is stored in the first federated archive; and retrieving the portion of the second subset of data from the first federated archive.

31. The article of manufacture of claim 21, further comprising:

updating at least one configuration parameter;

receiving a query, and processing the query to retrieve a second subset of data from the first federated archive in accordance with the at least one configuration parameter.

32. The article of manufacture of claim 21 wherein at least one rule from the first set of rules associates a predicate with a retention period on a table in the one or more first data sources and is combined with another rule to express a dependency between a different table in the one or more first data sources.

33. The article of manufacture of claim 21, further comprising:

updating a value of a portion of the first subset of data in the first federated archive.

* * * * *